(12) United States Patent
Lamontagne et al.

(10) Patent No.: US 9,939,604 B2
(45) Date of Patent: Apr. 10, 2018

(54) OPTICAL ASSEMBLY WITH TRANSLATABLE CENTERED SLEEVE

(71) Applicant: INSTITUT NATIONAL D'OPTIQUE, Québec (CA)

(72) Inventors: Frédéric Lamontagne, Québec (CA); Nichola Desnoyers, Québec (CA)

(73) Assignee: INSTITUT NATIONAL D'OPTIQUE, Quebec, Quebec (CA)

( * ) Notice: Subject to any disclaimer, the term of this patent is extended or adjusted under 35 U.S.C. 154(b) by 0 days.

(21) Appl. No.: 15/087,433

(22) Filed: Mar. 31, 2016

(65) Prior Publication Data

US 2016/0291281 A1 Oct. 6, 2016

Related U.S. Application Data

(60) Provisional application No. 62/140,639, filed on Mar. 31, 2015.

(51) Int. Cl.
*G02B 7/00* (2006.01)
*G02B 7/02* (2006.01)

(52) U.S. Cl.
CPC ............. *G02B 7/003* (2013.01); *G02B 7/023* (2013.01); *G02B 7/026* (2013.01)

(58) Field of Classification Search
CPC .......... G02B 7/02; G02B 7/003; G02B 7/022; G02B 7/026
USPC ........................ 248/187.1; 359/630, 819, 820
See application file for complete search history.

(56) References Cited

U.S. PATENT DOCUMENTS

| 2,526,433 | A | 10/1950 | Svensson |
| 3,142,239 | A | 7/1964 | Meixner |
| 3,269,264 | A | 8/1966 | Cocks |
| 3,378,020 | A | 4/1968 | Grabiel |
| 3,685,392 | A | 8/1972 | Platt |
| 3,888,568 | A | 6/1975 | Norris et al. |
| 4,390,260 | A | 6/1983 | Prinz |
| 4,733,945 | A | 3/1988 | Bacich |

(Continued)

FOREIGN PATENT DOCUMENTS

| CN | 1854789 A | 11/2006 |
| CN | 203164577 U | 8/2013 |

(Continued)

OTHER PUBLICATIONS

Yoder, "Mounting Optics in Optical Instruments", SPIE Press Book, p. 49, 2008.

(Continued)

*Primary Examiner* — Steven M Marsh
(74) *Attorney, Agent, or Firm* — Merchant & Gould P.C.

(57) ABSTRACT

Optical assemblies include a barrel defining a cavity having a center axis, a sleeve inserted in the cavity, one or more optical elements mounted within the sleeve and a retaining ring inserted into the cavity and securing the sleeve. The sleeve engages the barrel inner wall through a thread engagement allowing a longitudinal displacement of the sleeve within the cavity. The retaining ring is also threadably engaged within the barrel, and the profile of the corresponding threads, as well as the spatial profile of a peripheral transversal surface of the sleeve engaging the retaining ring, are selected to provide centering of the sleeve with respect to the center axis of the cavity throughout the longitudinal displacement of the sleeve.

21 Claims, 18 Drawing Sheets

(56) References Cited

U.S. PATENT DOCUMENTS

| | | | |
|---|---|---|---|
| 4,778,252 A | 10/1988 | Filho | |
| 4,854,671 A | 8/1989 | Hanke et al. | |
| 4,883,968 A | 11/1989 | Hipple et al. | |
| 5,076,682 A | 12/1991 | Pasfield | |
| 5,121,251 A | 6/1992 | Edwards | |
| 5,177,641 A | 1/1993 | Kobayashi et al. | |
| 5,245,478 A | 9/1993 | Luecke | |
| 5,510,935 A | 4/1996 | Whitty et al. | |
| 6,014,269 A * | 1/2000 | Nomura | G02B 7/102 359/700 |
| 6,204,977 B1 * | 3/2001 | Iwasa | G02B 7/102 359/700 |
| 6,292,311 B1 | 9/2001 | Bohn et al. | |
| 6,381,081 B1 | 4/2002 | Ford | |
| 7,990,632 B2 | 8/2011 | Monti | |
| 9,244,245 B2 | 1/2016 | Lamontagne et al. | |
| 2002/0021504 A1 | 2/2002 | Bayer et al. | |
| 2002/0176180 A1 | 11/2002 | Ue et al. | |
| 2003/0076504 A1 | 4/2003 | Marcus et al. | |
| 2013/0182342 A1 | 7/2013 | Chang et al. | |
| 2015/0092105 A1 * | 4/2015 | Brinks | G03B 17/12 348/374 |
| 2015/0131175 A1 | 5/2015 | Lamontagne et al. | |
| 2016/0025950 A1 | 1/2016 | Lamontagne et al. | |

FOREIGN PATENT DOCUMENTS

| | | |
|---|---|---|
| DE | 19943452 A1 | 3/2000 |
| JP | 2012173366 A | 9/2012 |
| TW | 200829951 A | 7/2008 |

OTHER PUBLICATIONS

Lee et al., "Creative Optomechanical Tolerancing in Lens Systems", Proc of the SPIE, vol. 3482, p. 187-200, 1998.

Dewitt et al., "Rigid Body Movements of Optical Elements due to Opto-Mechanical Factors", Proc. of the SPIE, vol. 5867, p. 1-12, 2005.

Cheng et al., "A Study on the Optomechanical Tolerance Model for Lens Assembly", Proc. of the SPIE, vol. 6665, p. 1-8, 2007.

Burge, "Mounting of Optical Components—Mounting of Lenses", The University of Arizona, p. 1-46, 2011.

\* cited by examiner

OPTICAL ASSEMBLY WITH TRANSLATABLE CENTERED SLEEVE

This application claims benefit of U.S. Provisional Application Ser. No. 62/140,639, filed 31 Mar. 2015 and which application is incorporated herein by reference. To the extent appropriate, a claim of priority is made to the above disclosed application.

FIELD OF THE INVENTION

The present invention relates to mechanical components for optical systems and more particularly concerns an optical assembly that allows the longitudinal displacement of a sleeve in a barrel, therefore longitudinally displacing one or more optical elements mounted in the sleeve while ensuring the centering of these optical elements in the barrel.

BACKGROUND

Optical elements or components are omnipresent in devices, systems or arrangements where light needs to be directed, expanded, focussed, collimated or otherwise transformed or affected. Optical elements can for example be embodied by lenses, mirrors, Diffractive Optical Elements (DOE), assemblies thereof, or the like.

In a typical optical system, most or all optical elements usually need to be precisely positioned and aligned in order to properly perform their intended optical function. This positioning and alignment typically involve securing the optical element in a holder or mount of some sort. Proper alignment of an optical element with respect to the holder is a delicate operation that generally requires tight manufacturing tolerances and careful handling.

Barrels are well known types of mechanical holders for optical elements. Barrels typically define a cylindrical cavity in which one or more optical elements are mounted. By way of example, a lens is a type of optical element that is often mounted in barrels. A lens generally needs to be centered with a precision that can be of the order of a few micrometers. Opto-mechanical assemblies in which lenses are mounted and precisely centered are known in the art. Referring to FIG. 1 (PRIOR ART), there is shown a typical assembly 20 including a lens 22, a barrel 24 and a retaining ring 26. The lens 22 is mounted in the barrel 24 with the periphery of one of its surfaces S1 in contact with a lens seat 28. The retaining ring 26 is typically threaded within the barrel 24 and abuts on the surface S2 of the lens 22 opposite to the lens seat 28, thus securing the lens 22 in the assembly 20. It is well known in the art that the lens is centered when both centers of curvature C1 and C2 lie on the center axis B of the lens barrel 24.

The technique consisting in inserting a lens in a lens barrel and then securing the lens with a threaded ring is generally referred to as the "drop-in" lens technique. The centering precision obtained from this technique first depends on the minimum allowable radial gap between the lens and the barrel. Thermal effects caused by the mismatch of the respective coefficients of thermal expansion of the lens and barrel materials also impacts on the centering of the lens. Manufacturing tolerances on dimensions of the components of the assembly such as the diameter of the lens, the diameter of the barrel cavity and the differences in thickness along the edge of the lens also affect the quality of the centering. The greater the precision required on the centering of the lens, the greater the manufacturing costs of both lens and barrel.

The main advantages of the drop-in technique are that the assembly time can be very short and that the lenses are removable. Low cost drop-in has, however, the drawback of a lower centering precision. The drop-in method may not be suitable when higher precision is required; then an active alignment is typically chosen. In this centering method, the lens is first positioned inside the cavity and its decentering relative to the reference axis of the barrel is measured. The lens is then moved to reduce the centering error. These steps can be repeated several times until the alignment of the lens complies with the centering requirements.

Once centered, the lens is fixed in place with adhesive or other means. This method provides a very high level of centering accuracy, but requires expensive equipment while being time-consuming.

While the discussion above concerns mainly lenses, other types of optical elements can be mounted in a barrel using a retaining ring, and such elements are confronted with the same issues discussed above.

In some applications, it may be desirable to translate one or more lenses or other optical elements longitudinally within a barrel. This translation may, for example, provide focussing and/or zooming features to the optical assembly. Such a translation is however impossible in optical configurations such as described above with respect to FIG. 1, where the alignment of the lens depends on the presence of a seat machined in the cavity. Furthermore, any displacement of an optical element within a barrel may require a re-centering of the optical element.

Thus, there remains a need for an approach to mount an optical element in a barrel which alleviates at least some of the drawbacks of known techniques.

SUMMARY

In accordance with aspects of the invention, optical assemblies are provided including a barrel defining a cavity having a center axis, a sleeve inserted in the cavity, one or more optical elements mounted within the sleeve and a retaining ring inserted into the cavity and securing the sleeve. The sleeve engages the barrel inner wall through a thread engagement allowing a longitudinal displacement of the sleeve within the cavity. The retaining ring is also threadably engaged within the barrel, and the profile of the corresponding threads in conjunction with the spatial profile of a peripheral transversal surface of the sleeve engaging the retaining ring provide a centering of the sleeve within the cavity throughout the longitudinal displacement of the sleeve within the cavity.

In accordance with one aspect, there is provided an optical assembly including the following:

a barrel defining a cavity having a center axis, the barrel comprising an inner wall provided with a first set of barrel threads and a second set of barrel threads;
  a sleeve inserted in the cavity and having a forward end and a rearward end, the forward end comprising an outer wall provided with a set of sleeve threads engaging the first set of barrel threads so as to allow a longitudinal displacement of the sleeve within the cavity upon rotation of the sleeve, the rearward end of the sleeve comprising a peripheral transversal surface having a curved spatial profile;
  at least one optical element mounted within the sleeve and centered with respect thereto; and
  a retaining ring affixed to the barrel through a set of ring threads engaging the second set of barrel threads, the retaining ring having an abutment engaging the peripheral transversal surface of the sleeve, the ring threads having a rearward thread face forming an effective thread angle with respect to a plane P perpendicular to the center axis of the cavity, wherein the effective thread angle of the ring threads and the curved spatial profile of the peripheral transversal surface are selected in view of an auto-centering condition whereby any decentering of the retaining ring and a corresponding tilt of the retaining ring with respect to the center axis have counterbalancing effects on a centering of the sleeve with respect to the center axis.

In accordance with another aspect there is provided an optical assembly, comprising:

a barrel defining a cavity having a center axis, the barrel comprising an inner wall provided with a first set of barrel threads and a second set of barrel threads;

a sleeve inserted in the cavity and having a forward end and a rearward end, the forward end comprising an outer wall provided with a set of sleeve threads engaging the first set of barrel threads so as to allow a longitudinal displacement of the sleeve within the cavity upon rotation of the sleeve, the rearward end of the sleeve comprising a peripheral transversal surface having a spatial profile;

at least one optical element mounted within the sleeve and centered with respect thereto; and a retaining ring affixed to the barrel through a set of ring threads engaging the second set of barrel threads, the retaining ring having an abutment engaging the peripheral transversal surface of the sleeve, the ring threads having a rearward thread face, wherein the rearward thread face of the ring threads and the spatial profile of the peripheral transversal surface extend perpendicularly to the center axis of the cavity.

In accordance some embodiments, there is provided an optical assembly including the following:

a barrel defining a cavity having a center axis. The barrel includes an inner wall provided with a first set of barrel threads and a second set of barrel threads;

a sleeve inserted in the cavity and having a forward end and a rearward end. The forward end has an outer wall provided with a set of sleeve threads engaging the first set of barrel threads so as to allow a longitudinal displacement of the sleeve within the cavity upon rotation of the sleeve. The rearward end of the sleeve has a peripheral transversal surface having a spatial profile;

at least one optical element mounted within the sleeve and centered with respect thereto; and a retaining ring affixed to the barrel through a set of ring threads engaging the second set of barrel threads. The retaining ring has an abutment engaging the peripheral transversal surface of the sleeve. The ring threads having a rearward thread face, an orientation of the rearward thread face of the ring threads and the spatial profile of the peripheral transversal surface being selected to provide a centering of the sleeve with respect to the center axis of the cavity throughout the longitudinal displacement of the sleeve within the cavity.

In some variants, the spatial profile of the peripheral transversal surface may be curved, and the rearward thread face of the ring threads forms an effective thread angle with respect to a plane P perpendicular to the center axis of the cavity. The effective thread angle and the curved spatial profile of the peripheral transversal surface are selected in view of an auto-centering condition whereby any decentering of the retaining ring and a corresponding tilt of the retaining ring with respect to the center axis have counterbalancing effects on a centering of the sleeve with respect to the center axis.

In other variants, the rearward face of the ring threads and the peripheral transversal surface may extend parallel to the plane P perpendicular to the center axis of the cavity.

In accordance with another aspect, there is also provided an optical assembly, comprising:

a barrel defining a cavity having a center axis, the barrel comprising an outer wall provided with a first set of barrel threads and a second set of barrel threads;

a sleeve threadable over the barrel and having a forward end and a rearward end, the forward end comprising an inner wall provided with a set of sleeve threads engaging the first set of barrel threads so as to allow a longitudinal displacement of the sleeve with respect to the barrel upon rotation of the sleeve, the rearward end of the sleeve comprising a peripheral transversal surface having a spatial profile;

at least one optical element mounted within the sleeve and centered with respect thereto; and a retaining ring affixed to the barrel through a set of ring threads engaging the second set of barrel threads, the retaining ring having an abutment engaging the peripheral transversal surface of the sleeve, the ring threads having a rearward thread face, an orientation of the rearward thread face of the ring threads and the spatial profile of the peripheral transversal surface being selected to provide a centering of the sleeve with respect to the center axis of the barrel throughout the longitudinal displacement of the sleeve with respect to the barrel.

Features and advantages of the invention will be better understood upon a reading of embodiments thereof with reference to the appended drawings.

DESCRIPTION OF EMBODIMENTS

The description below is directed to optical assemblies that allow the longitudinal displacement of a sleeve in a barrel, therefore longitudinally displacing one or more optical elements mounted in the sleeve while ensuring the centering of these optical elements in the barrel.

Figure 1:
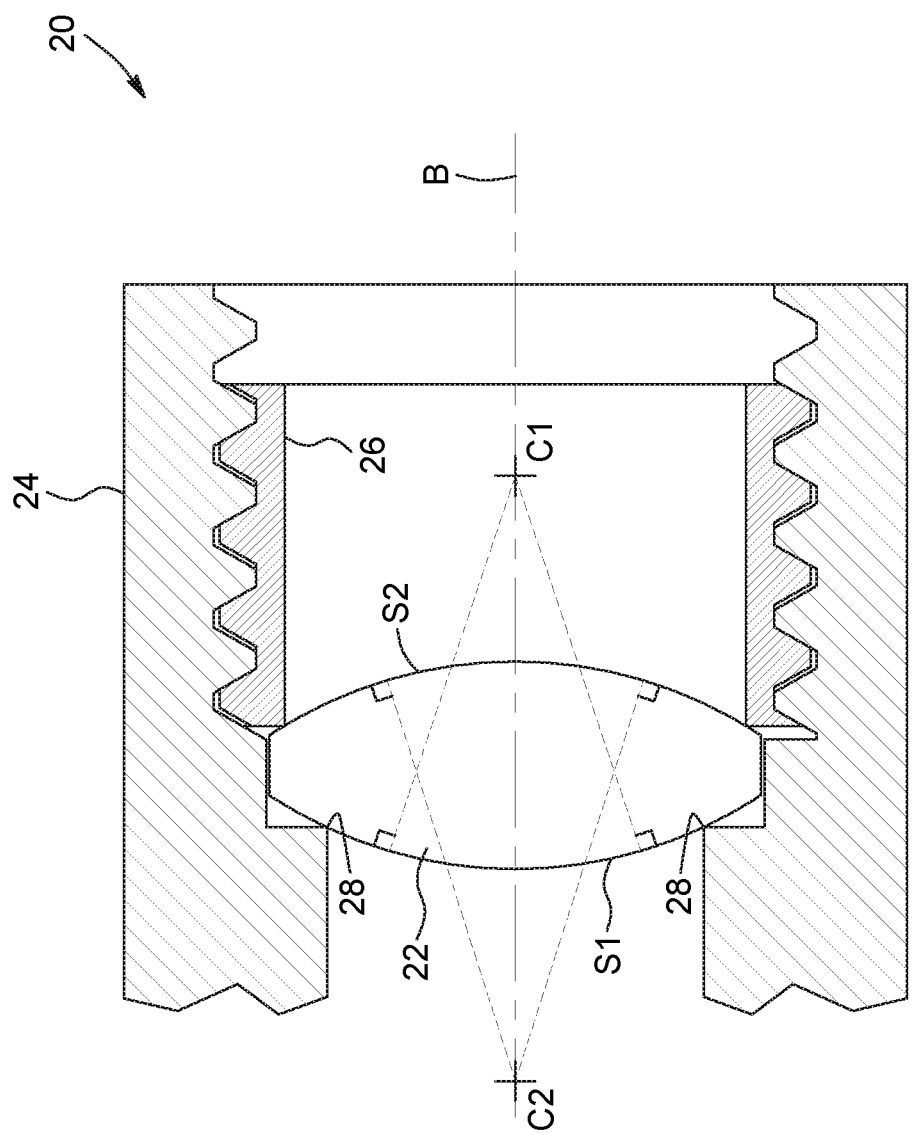
FIG. 1 (PRIOR ART) is a lens assembly showing a biconvex lens mounted in a lens barrel according to prior art.
Figure 2:
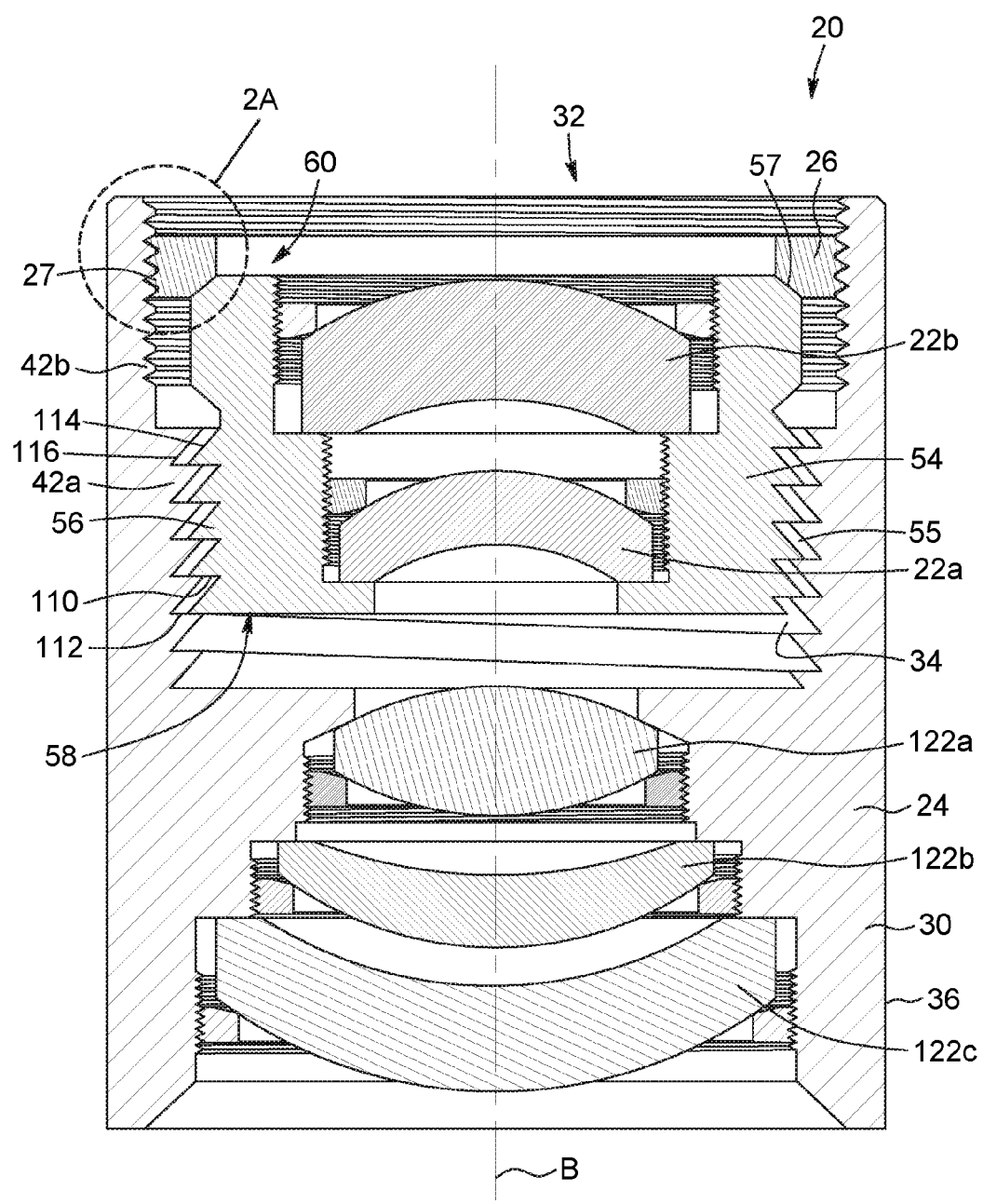
FIG. 2 is a schematic cross-section view of an optical assembly including a sleeve in a barrel and fixed optical elements according to one embodiment.
Figure 2A:
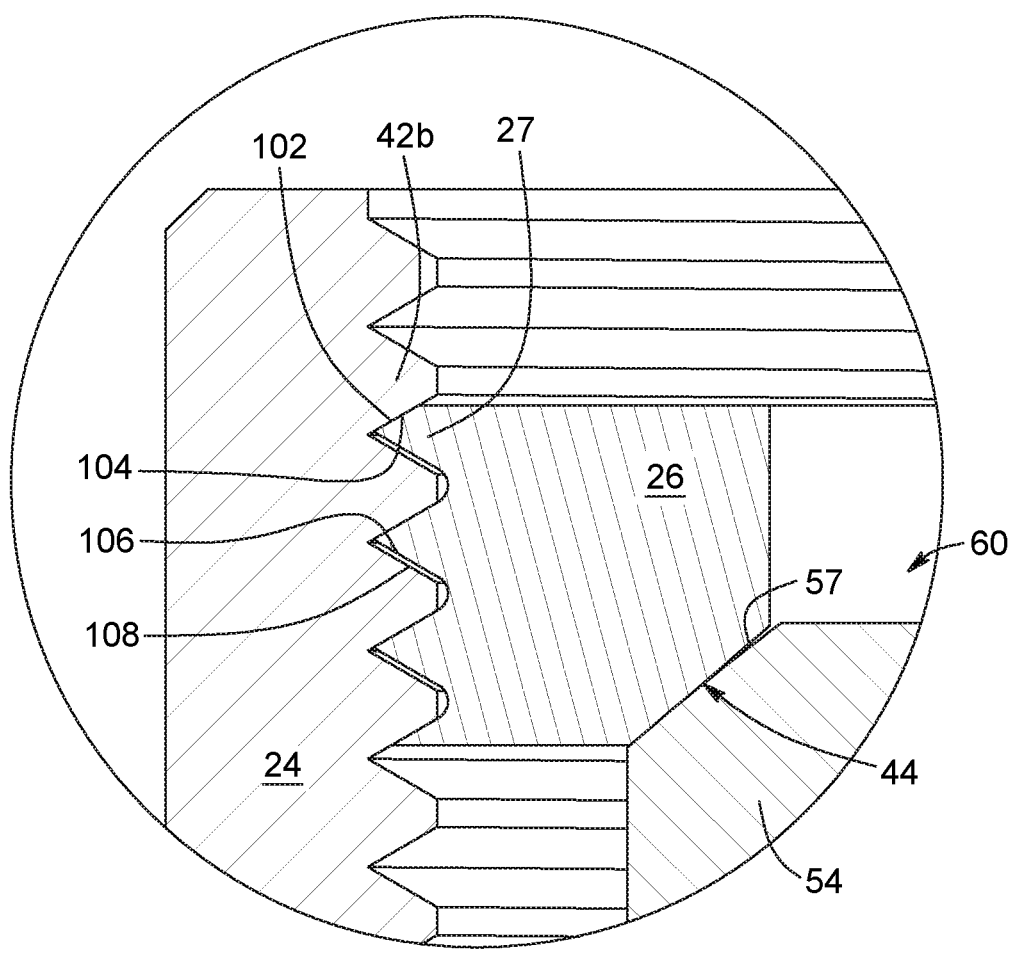
FIG. 2A is an enlarged view of a portion of FIG. 2.

Referring to FIGS. 2 and 2A, there is shown an optical assembly 20 according to one embodiment. The optical assembly 20 generally includes a barrel 24 defining a cavity 32. The cavity 32 has a center axis B, defined as its axis of symmetry. A sleeve 54 is inserted in the cavity 32, one or more optical elements 22 are mounted within the sleeve 54 and a retaining ring 26 is inserted into the cavity and secures the sleeve 54 therein. By way of example, two optical elements 22a and 22b are shown mounted within the sleeve 54 in the illustrated embodiment of FIG. 2, but one skilled in the art will understand that a single optical element or a greater number of optical elements may be provided in the sleeve in alternative embodiments.

The barrel 24 may be embodied by any structure in which one or more optical elements are to be mounted and centered. Typical barrels such as the one illustrated in FIG. 2 include a hollow cylindrical housing 30 having an inner wall 34 and an outer wall 36. It will be readily understood that the barrel 24 may have any shape, mechanical features or additional components adapted to engage, connect to or otherwise interact with other structures as required by the context in which the optical assembly 20 is to be used. For example, the outer wall 36 of the barrel 24 may be provided with threads, holes, pins, projections, flanges and the like without departing from the scope of the invention. Alternatively, the barrel 24 may be an integral part of a larger optical assembly, such as for example a camera objective or a microscope objective.

The sleeve 54 may be embodied by any structure sized and shaped to fit within or onto the barrel and to receive the one or more optical elements therein. The sleeve 54 has a forward end 58 and a rearward end 60. By convention, the forward end 58 corresponds to the extremity of the sleeve 54 inserted first in the cavity 32, whereas the rearward end 60 corresponds to the opposite extremity. The rearward end 60 of the sleeve 54 has a peripheral transversal surface 57 having a spatial profile which may for example be curved or flat, as will be described and explained further below.

Each of the one or more optical elements 22 mounted in the sleeve 54 may be embodied by any component acting on light in some fashion, for example to direct or change the direction of a light beam, focus or expand, collimate, filter, or otherwise transform or affect light. Examples of optical elements 22 include lenses of any type, such as for example, plano-convex, biconvex, plano-concave, biconcave, positive or negative meniscus lenses. Cemented doublet or triplet lenses of the types listed above can also be considered. The optical element 22 may also be embodied by diffractive lenses, mirrors, diffractive optical elements (DOEs), pinholes, or the like. The optical element 22 may have spherical or aspherical surfaces and may have an off-axis profile. In other embodiments, the optical element may be embodied by a more complex subassembly of optical components such as for example one or more lenses mounted in an inner sleeve, a mirror or a lens mounted in a spider, a lens or a lens barrel mounted in an optical mount which is itself mounted on an optical bench, etc. In other variants, the optical element 22 may be embodied by typical components of optical assemblies such as a prism, wave plate or camera. Other possibilities include optical fibers, detectors, corner cubes, light sources such as lasers, LEDs, LCDs, light bulbs, and the like, or a Micro-Opto-Electro-Mechanical System (MOEMS) such as for example a Digital Light Processing (DLP) system. It will be readily understood that in embodiments where more than one optical element are mounted within a same sleeve, each of these optical elements may be of a different type without departing from the scope of the present invention.

Preferably, each optical element 22a, 22b may be centered with respect to the sleeve 54, such that proper centering of the sleeve 54 in the cavity 32 will consequently center the optical elements 22a, 22b with respect to the center axis B of the cavity 32. In various implementations, the optical elements 22 may be mounted in the sleeve 54 using the common "drop-in" approach discussed above, and/or may be held in place using a threaded ring, a snap ring, a flexure, an elastomeric retainer, a burnished edge or any other suitable means. In some embodiments, one or more of the optical elements 22a, 22b may be auto-centered within the sleeve 54 using a threaded retaining ring 26 in accordance with the principle explained below and in U.S. Pat. No. 9,244,245 (LAMONTAGNE et al.), issued on Jan. 26, 2016 and entitled "Auto-centering of an optical element within a barrel", the entire contents of which being incorporated herein by reference. Each optical element 22a, 22b may also be centered according to a different technique, for example through the use of an alignment mechanism followed by bonding of the optical element.

The retaining ring 26 secures the sleeve 54 in the cavity 32 by applying a longitudinal force on the rearward end 60 of the sleeve 54. Referring more particularly to FIG. 2A, the retaining ring 26 has an abutment 44 engaging the peripheral transversal surface 57 of the rearward end 60 of the sleeve 54. In the illustrated embodiment, the abutment 44 is defined by a bevelled inner edge of the retaining ring 26 which contacts the peripheral transversal surface 57. Optionally, the abutment 44 may end in a rounded corner to avoid damaging the peripheral transversal surface 57. However, in other embodiments the abutment may have a straight edge shape. Other types of engagements may also be considered. It will be readily understood that the abutment 44 may alternatively be embodied by different structures allowing a suitable contact between the retaining ring 26 and the peripheral transversal surface 57. For example, in some assemblies the abutment 44 may have an irregular shape providing distributed points of contact with the peripheral transversal surface 57.

The sleeve 54 and the retaining ring 26 are mounted within the barrel 24 through respective thread engagements, which will now be described in more details.

Referring to FIGS. 2 and 2A, the inner wall 34 of the barrel 24 is provided with a first set of barrel threads 42a and a second set of barrel threads 42b. The first set of barrel threads 42a extends forward, that is, deeper within the cavity 32 than the second set of barrel threads 42b. The forward end 58 of the sleeve 54 has an outer wall 55 provided with a set of sleeve threads 56 engaging the first set of barrel threads 42a. The retaining ring 26 is affixed to the barrel 24 through a set of ring threads 27 engaging the second set of barrel threads 42b. Each set of threads can be defined by forward and rearward thread faces.

The expression "threads" is meant to refer to engageable helicoidal projections on two components, allowing one component to be screwed on or within the other. By convention, a single thread is generally considered to be the portion of a helicoidal projection corresponding to one screw turn, whereas the length of the projection defining the entire screw path is referred to as threading or a set of threads.

The first set of barrel threads 42a and the sleeve threads 56, on the one hand, and the second set of barrel threads 42b and the set of ring threads 27, on the other hand, have thread profiles that are complementary. The expression "thread profile" refers to the cross-sectional shape, angle and pitch formed by the threads of a given set. By <<complementary>>, it is understood that the corresponding profiles are such that the complementary sets of threads can be screwed together, which usually involves a same pitch. Although complementary sets of threads are shown as having a same overall thread profile in the illustrated embodiments, in other variants they may have different shapes as long as the complementary condition as explained above is met.

Longitudinal Displacement of the Sleeve

At the forward end 58 of the sleeve 54, the engagement of the sleeve threads 56 with the first set of barrel threads 42a allows a longitudinal displacement of the sleeve 54 within the cavity 32.

The expression "longitudinal displacement" is understood to refer to a translation of the sleeve 54 along the center axis B. It will be readily understood by one skilled in the art that imparting a rotational movement on the sleeve 54 will move the sleeve 54 longitudinally within the cavity, following the path defined by the engagement of the sleeve threads 56 and the first set of barrel threads 42a. The sense of rotation determines if the sleeve 54 is moved in or out of the cavity 32. When the retaining ring 26 is tightened to apply a longitudinal force on the sleeve, the forward threads face 110 of the sleeve threads 56 presses against the rearward thread face 112 of the first set of barrel threads 42a, the latter acting as a "seat" supporting the forward end 58 of the sleeve 54. As can be seen in FIG. 2, the rearward thread face 114 of the sleeve threads 56 and the forward thread face 116 of the first set of barrel threads 42a have a negligible impact on the engagement of the sleeve with the barrel and indeed, in some instances, may not even contact each other. As a consequence, the thread angle formed by the forward and rearward thread faces of the first set of barrel threads and the sleeve threads, respectively, does not affect the alignment of the sleeve and can be selected in view of other design parameters.

In the illustrated embodiment of FIG. 2, the rearward thread face 112 of the first set of barrel threads 42a and the forward thread face 110 of the sleeve threads 56 are perpendicular to the center axis B of the cavity 32. As will be readily understood by one skilled in the art, in typical optical assemblies of the type described herein there is a certain amount of lateral play between engaged threads. This can lead to a decentering of the sleeve within the cavity. This decentering leads, in turn, to a proportional tilt of the sleeve, which is transferred to the optical elements mounted therein. The provision of engaging thread faces 110, 112 perpendicular to the center axis of the cavity can advantageously ensure that the sleeve 54 will not be tilted by the orientation of the threads no matter the amount of lateral play of the sleeve within the cavity 32. This remains true no matter the longitudinal position of the sleeve 54 within the cavity 32.

It will however be understood that in other variants the first set of barrel threads 42a and the sleeve threads 56 may have a different thread profile, for example a symmetrical thread profile. In some embodiments, the thread profile of the first set of barrel threads 42a and of the sleeve threads 56 may define a triangular shape or a trapezoidal shape. This is for example shown in FIG. 5 (trapezoidal shape) and FIG. 7 (triangular shape). The corresponding thread angle may have any suitable value, including typical values such as 29° (as with standard ACME threads), 55° or 60°, which are common values for standard threads.

Through the configurations described herein, the position of the sleeve 54 within the barrel 24, and therefore the position of the optical elements 22a, 22b within the barrel 24, can be adjusted longitudinally. As will be readily understood by one skilled in the art, translating an optical element such as a lens moves its focal planes accordingly and therefore provides for an adjustment of a focus or of other optical feature of the optical assembly 20.

Some implementations of the configurations described herein may be useful in the context of an optical assembly 20 which further includes at least one fixed optical element 122 mounted within the cavity 32. In the embodiment of FIG. 2, three such fixed optical elements 122a, 122b and 122c are shown. The longitudinal displacement of the sleeve 54 within the cavity 32 changes the distance between the fixed optical elements 122 and the optical elements 22 mounted within the sleeve 54.

Figure 3:
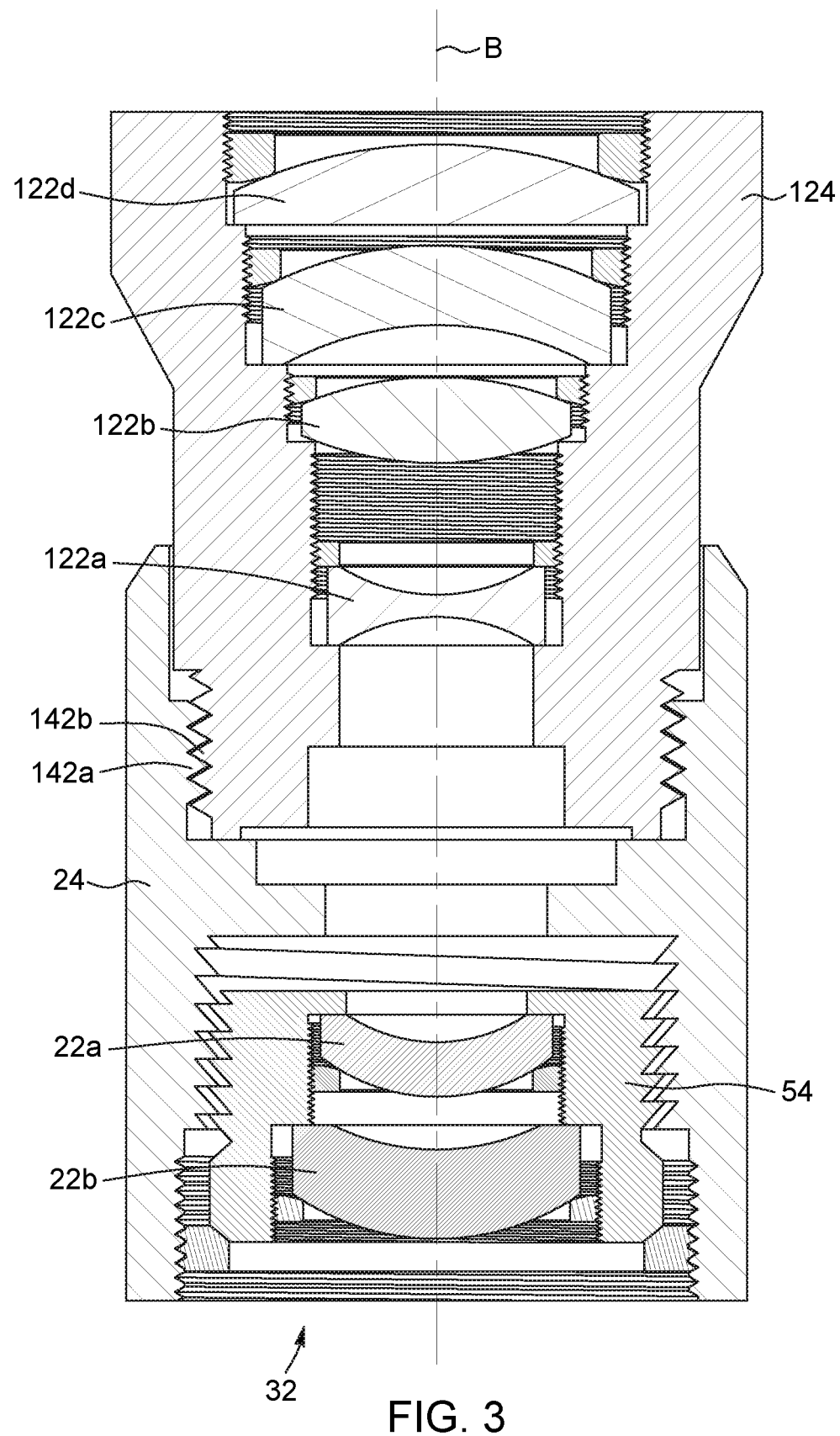
FIG. 3 is a schematic cross-section view of an optical assembly including a sleeve in a barrel and an external optical structure including fixed optical elements according to one embodiment.

Referring to FIG. 3, in other implementations the barrel 24 may be affixed to an external optical structure 124 having one or more fixed optical elements 122a, 122b, 122c and 122d optically aligned with the cavity 32 of the barrel 24. In the illustrated variant of FIG. 3, the external optical structure 124 may be viewed as a second barrel, mounted concentrically to an extremity of the barrel 24, in which the additional optical elements 122 such as lenses, mirrors, diffractive optical elements, pinholes or the like are mounted and preferably aligned and centered using an appropriate technique. In such implementations, the external optical structure 124 is for example screwed in the barrel 24 from an extremity opposite to the extremity through which the sleeve 54 and retaining ring are inserted. Again, in such implementations, the longitudinal displacement of the sleeve 54 within the cavity 32 changes the distance between the fixed optical elements 122a, 122b, 122c and 122d within the external optical structure 124 and the optical elements 22a, 22b mounted within the sleeve 54.

As will be readily understood by one skilled in the art, the reference to a longitudinal displacement of the sleeve within the barrel is used herein to describe a relative movement between these two components. Although this longitudinal displacement was described above as a rotation of the sleeve while the barrel remains fixed in space, in other variants the longitudinal displacement can be achieved by rotating the barrel with respect to the sleeve. For example, in some implementations it may be desired to maintain the rotational position of the sleeve and the optical elements therein fixed with respect to an external frame of reference.

Centering of the Sleeve

As mentioned above, the mounting of an optical element within a barrel requires great care. The same principle applies to the alignment of a sleeve within the cavity, which directly impacts the orientation of the optical elements within. A longitudinal displacement of the sleeve can however lead to a loss of the alignment achieved when the sleeve was in a previous position. To avoid such a misalignment, and alleviate the need for a realignment of the sleeve after a longitudinal displacement, an orientation of the rearward thread face of the ring threads and the spatial profile of the peripheral transversal surface may be selected to provide a centering of the sleeve within the cavity throughout the longitudinal displacement of the sleeve within the cavity. Therefore, the sleeve can be displaced longitudinally and locked in a new position within the cavity where it will be automatically centered, without requiring a complex or time consuming alignment procedure.

In accordance with one implementation, referring back to FIGS. 2 and 2A, this centering may be achieved through an engagement of the ring threads 27 with the second set of barrel threads 42b and an interaction of the abutment 44 of the retaining ring 26 with the peripheral transversal surface 57 of the sleeve 54 that provide for an auto-centering of the sleeve within the cavity 32.

Throughout the present description, the reference to an auto-centering condition relates to the counterbalancing effects of two different factors: the decentering of the retaining ring and the tilt of the retaining ring. These concepts will now be explained with reference to FIGS. 4A to 4C.

Figure 4A:
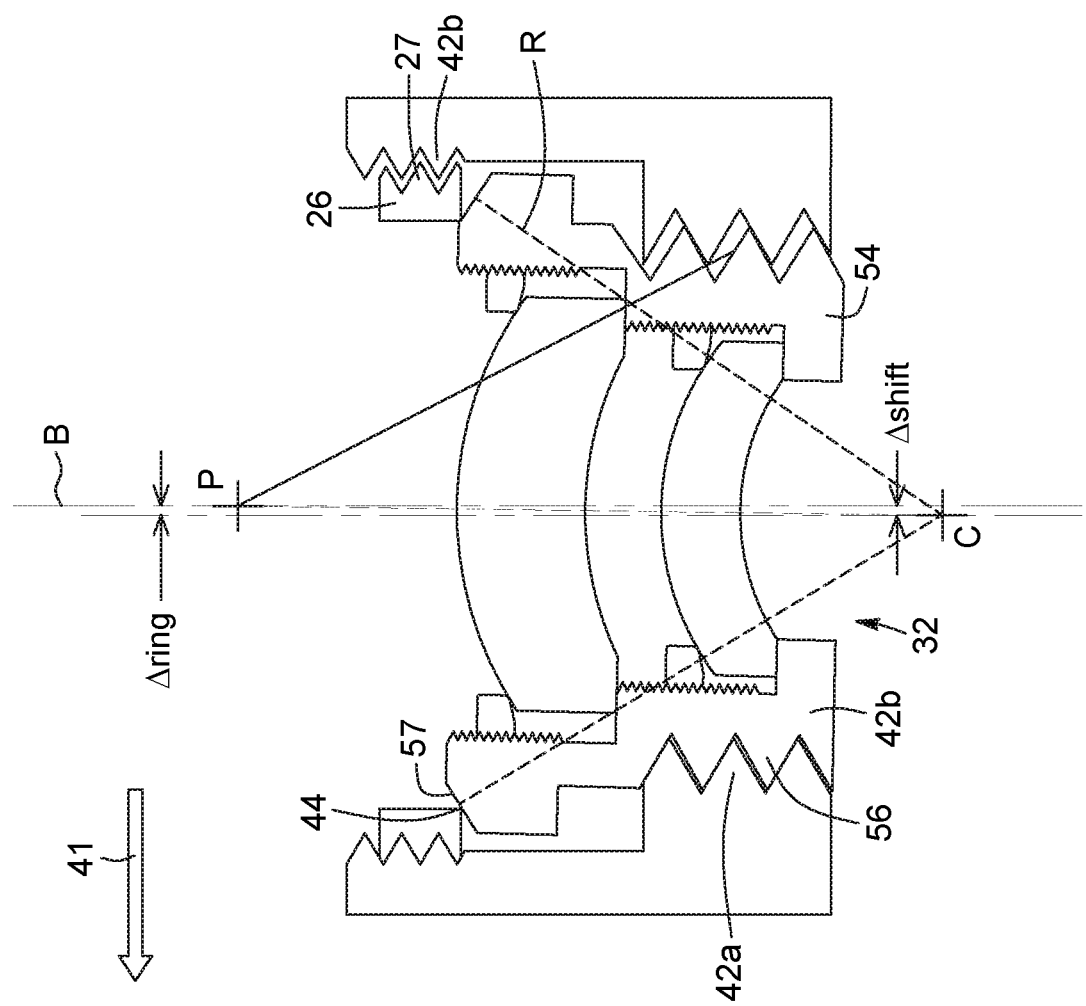
FIG. 4A is a schematic exaggerated illustration of the impact of the decentering of the retaining ring of an optical assembly on the centering of the sleeve within the barrel according to one embodiment.

Referring to FIG. 4A, the impact of the decentering of the retaining ring 26 on the centering of the sleeve 54 is illustrated through a simplified example. For the purpose of this demonstration it will be assumed that the spatial profile of the peripheral transversal surface 57 of the sleeve 54 is spherical, and that both the first and the second sets of barrel threads 42a, 42b are standard 60° triangular threads. These assumptions are made for the purpose of exemplification only, and one skilled in the art will understand that the peripheral transversal surface 57 may have a different curved spatial profile and that the first and second sets of barrel threads 42a, 42b may have different thread profiles without departing from the scope of the invention. Furthermore, it will be readily understood that FIG. 4A is not drawn to scale and that the decentering of the retaining ring 26 is shown thereon in an exaggerated and unrealistic fashion, for illustrative purposes.

As apparent from this illustration, the retaining ring 26 has a lateral play within the cavity 32, allowing its center to be shifted laterally on either side of the center axis B. In FIG. 4A, the retaining ring 26 is shown (exaggeratedly) shifted to the left side 41 of the cavity 32 by a distance $\Delta_{ring}$. As a result, the engagement of the abutment 44 of the retaining ring 26 with the peripheral transversal surface 57 is also shifted to the left. Since the lateral movement of the sleeve is constrained by the engagement of the sleeve threads 56 with the first set of barrel threads 42a, which are inclined with respect to the center axis B, the decentering of the retaining ring will result in a tilt of the sleeve 54 about a point P corresponding to the effective center of curvature of the sleeve threads 56. The center of curvature C of the peripheral transversal surface 57 is therefore shifted with respect to the center axis B of the cavity 32 by a distance $\Delta_{shift}$. The direction and magnitude of the shift of the center of curvature C of the peripheral transversal surface are the same as the direction and magnitude of the shift of the retaining ring within the cavity, and therefore it can be considered that $\Delta_{ring} \approx \Delta_{shift}$. Reference can be made to F. DeWitt IV et al. ("Rigid Body Movements of Optical Elements due to Opto-Mechanical Factors", *Proceedings of the SPIE* Vol. 5867, paper 58670H, (2005)) for a corroboration of this equivalence.

The situation illustrated in FIG. 4A is not completely realistic, as a decentered threaded retaining ring 26 will also have an inherent tilt with respect to the center axis B of the cavity. This tilt is illustrated, again in an exaggerated fashion for illustrative purposes, in FIG. 4B. The threaded engagement between the retaining ring 26 and the barrel 24 results in a pivoting of the retaining ring 26 with respect to the center axis B of the cavity, referred to herein as the tilt of the retaining ring 26. The tilt of the retaining ring has an impact on the engagement between the abutment 44 of the retaining ring 26 and the peripheral transversal surface 57 of the sleeve 54, therefore also imparting a tilt on the sleeve 54 itself, as allowed by the engagement of the first set of ring threads 42a with the sleeve threads 56. Tilting the sleeve shifts the center of curvature C of the peripheral transversal surface 57 relative to the center axis B of the cavity 32 by a distance $\Delta_{tilt}$. A clockwise tilt will shift the center of curvature towards the left, whereas a counter-clockwise tilt 43 will shift it to the right, the latter case being shown in FIG. 4B. As the optical element 22 is centered within the sleeve, its optical axis will also be shifted with respect to the center axis B of the cavity, leading to an optical misalignment.

Figure 4B:
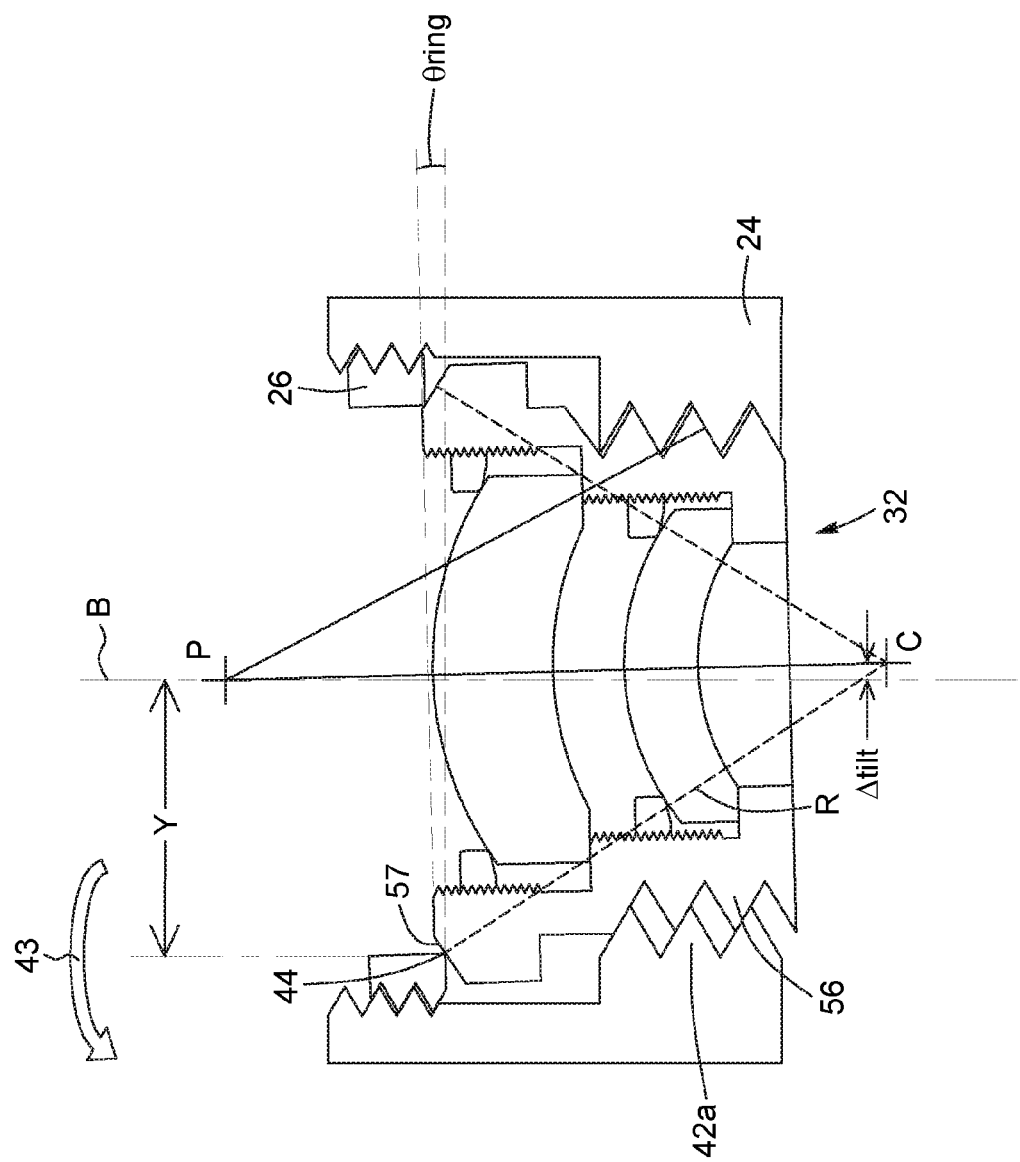
FIG. 4B is a schematic exaggerated illustration of the impact of the tilt of the retaining ring of an optical assembly on the centering of the sleeve within the barrel.

In the illustrated example of FIG. 4B, the lateral decentering of the center of curvature C of the peripheral transversal surface 57 resulting from a tilt of the retaining ring can be expressed as:

$$\Delta_{tilt} = \sin(\theta_{ring})\sqrt{R^2 - Y^2} \quad (1)$$

where:

$\Delta_{tilt}$ (mm) is the lateral decentering of the center of curvature of the peripheral transversal surface resulting from the tilt of the retaining ring;

R (mm) is the radius of curvature of the peripheral transversal surface;

Y (mm) is the half-diameter of the abutment of the retaining ring; and $\theta_{ring}$ (degrees) is the tilt of the retaining ring with respect to the plane perpendicular to the center axis B of the cavity.

Of course, Equation (1) holds only for absolute values of R larger than Y.

Figure 4C:
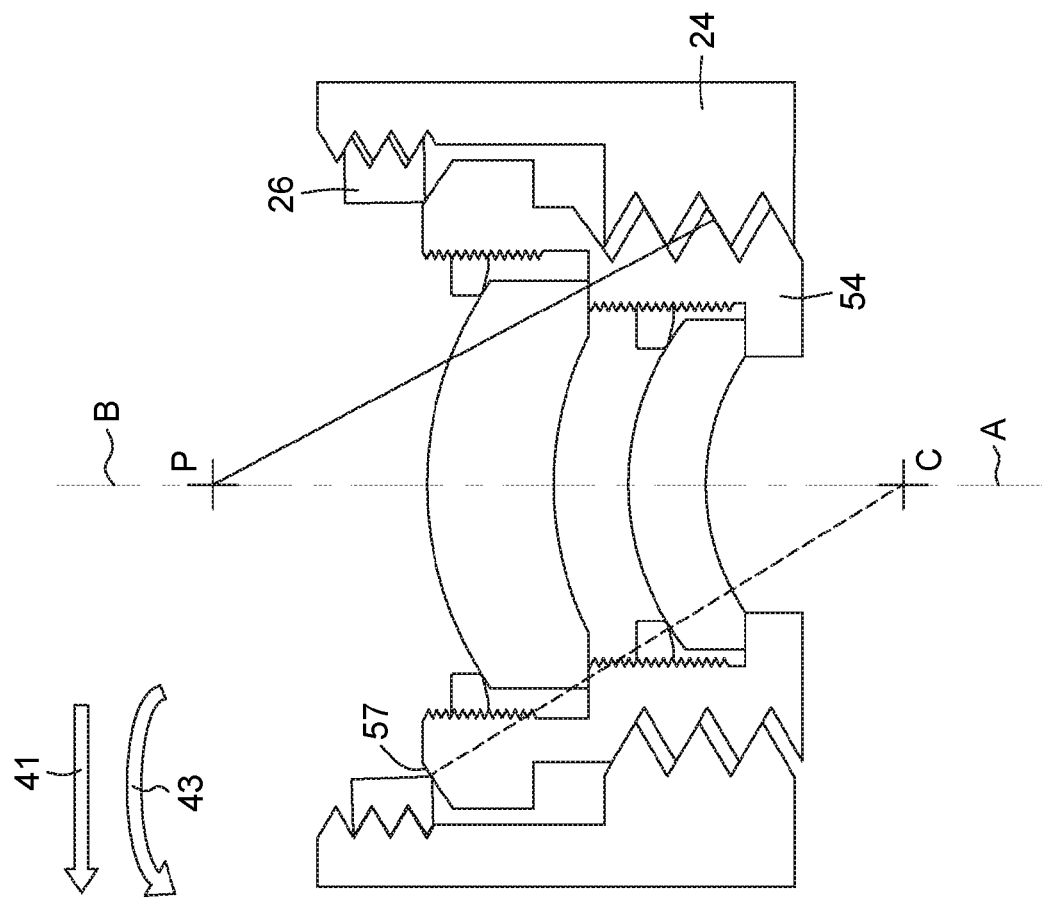
FIG. 4C is a schematic illustration of the joint impacts of the decentering and tilt of the retaining ring when the auto-centering condition explained herein is met.

The fact that the retaining ring 26 is threaded to the barrel 24 has for consequence that its tilt and its lateral decentering are linked to each other in a predetermined fashion. This is illustrated in FIG. 4C. In the configuration of FIGS. 4A to 4C, the retaining ring is tilted counterclockwise if it is shifted to the left (as shown in FIG. 4C), and clockwise if it is shifted to the right. The relationship between the shift (lateral decentering) and the tilt of the retaining ring can be expressed as follows:

$$\theta_{ring} = \sin^{-1}\left[\frac{2\Delta_{ring}\tan(\varphi_{threads}/2)}{d_{ring}}\right] \quad (2)$$

where:
- $\theta_{ring}$ (degrees) is the tilt of the retaining ring as defined above;
- $\Delta_{ring}$ (mm) is the lateral decentering of the retaining ring;
- $\varphi_{threads}$ (degrees) is the thread angle of the ring threads and second set of barrel threads; and
- $d_{ring}$ (mm) is the major diameter of the retaining ring (measured at the thread crest).

It can be demonstrated that the decentering $\Delta_C$ of the center of curvature C of the peripheral transversal surface 57 with respect to the center axis B of the cavity is the combined result of the decentering and corresponding tilt of the retaining ring 26 with respect to the center axis B:

$$\Delta_C = \Delta_{tilt} + \Delta_{shift} \quad (3)$$

where the sign of $\Delta_{tilt}$ and of $\Delta_{shift}$ refers to the direction of the corresponding shift.

In order for the sleeve to be centered, the decentering $\Delta_C$ should be made null or at least negligible. Knowing, as mentioned above, that the shift $\Delta_{shift}$ of the center of curvature C of the peripheral transversal surface with respect to the center axis of the cavity is equivalent to the shift $\Delta_{ring}$ of the retaining ring within the cavity, an auto-centering condition can be defined from equation (3) with $\Delta_C=0$, thus giving:

$$\Delta_{tilt} = \Delta_{ring} \quad (4)$$

where $\Delta_{tilt}$ and $\Delta_{ring}$ are expressed as absolute values in the above equation. It should be reminded that these parameters have opposite signs since they represent deviations of the center of curvature C that are in opposite directions relative to the center axis B, as seen by comparing FIGS. 4A and 4B. Equation (4) implies that the decentering of the retaining ring and the corresponding tilt of the retaining ring with respect to the center axis counterbalance each other.

Still referring to FIG. 4C, the auto-centering of the sleeve 54 is schematically illustrated, again in an exaggerated fashion for illustrative purposes. As can be seen, the retaining ring 26 is shifted laterally (to the left in the example, as illustrated by arrow 41) within the cavity, and also has a tilt with respect to the center axis B (counterclockwise in the example, as illustrated by arrow 43). However, as the decentering effects of these two parameters cancel each other, the optical axis A of the sleeve 54, nonetheless coincides with the center axis B of the cavity.

Throughout the present description references to the auto-centering condition relate to situations where the condition of equation (4) is met. Values of various parameters can be appropriately selected to meet this condition, such as the thread angle or profile, and the spatial profile of the peripheral transversal surface of the sleeve.

It will be noted that the auto-centering condition of the present description does not rely on the centering of the retaining ring with respect to the cavity; it decouples the centering of the sleeve from the alignment of the retaining ring within the cavity, which alleviates the impacts of the threading engagements within the barrel.

By combining equations (1), (2) and (4) above, the auto-centering condition can be rewritten as:

$$\frac{d_{ring}}{2\tan(\varphi_{threads}/2)} = \sqrt{R^2 - Y^2} \quad (5)$$

Figure 5:
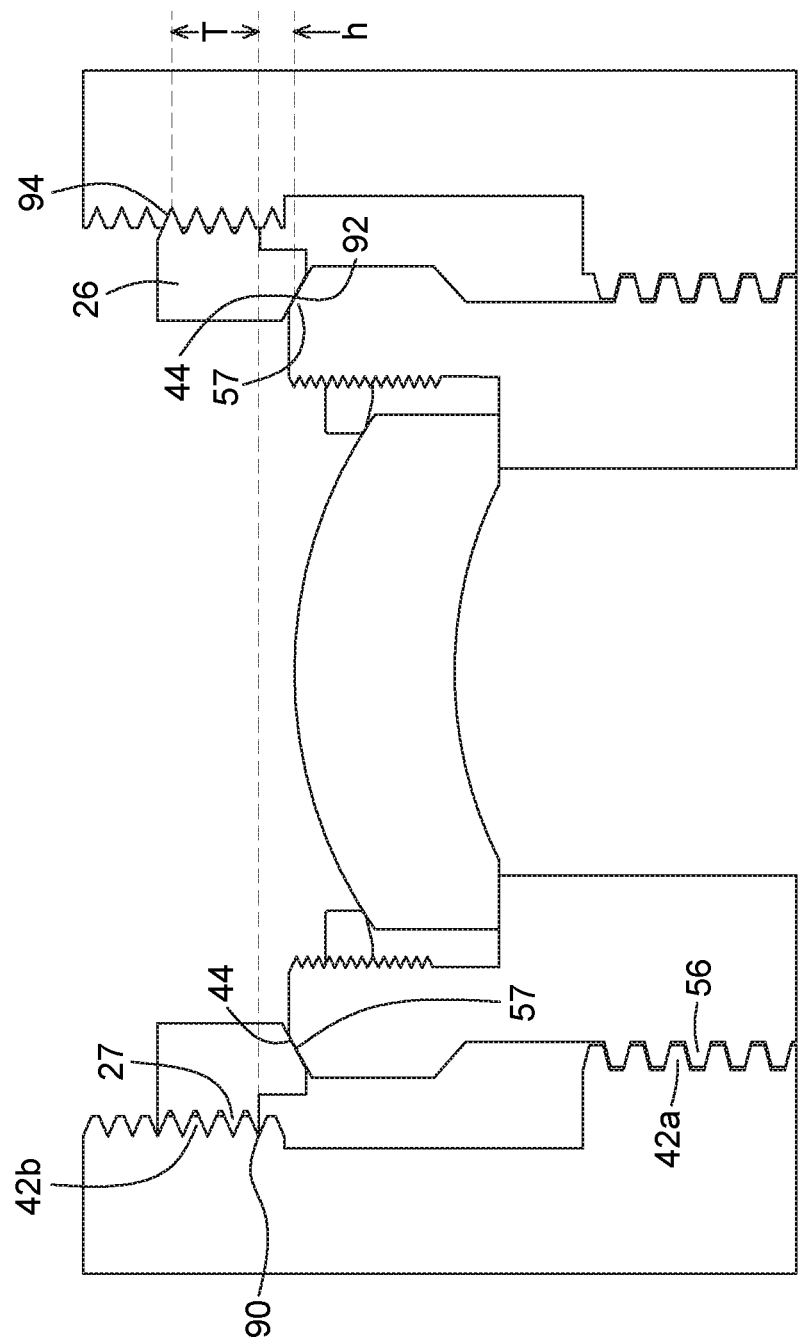
FIG. 5 is a schematic illustration of an optical assembly illustrating parameters T and h optionally used to determine the auto-centering condition.

One skilled in the art will readily understand that equation (5) above is based on a simplified model neglecting some geometrical factors having a slight impact on the decentering of the sleeve. A more sophisticated model could optionally take into account the exact shape of the retaining ring and the pitch of the second set of barrel threads. It can be demonstrated that using such a model, the auto-centering condition of equation (5) could be rewritten as:

$$\frac{d_{ring}}{2\tan(\varphi_{threads}/2)} = \sqrt{R^2 - Y^2} + h + T/2 \quad (6)$$

where the newly introduced parameters h and T, both represented on FIG. 5, are defined as follows:
- h is the distance along the longitudinal direction of the cavity between (i) a first point of contact 90 of the second set of barrel threads 42b with the set of ring threads 27 proximate to the sleeve 54 and (ii) a point of contact 92 of the abutment 44 of the retaining ring 26 with the peripheral transversal surface 57 of the sleeve 54;
- T is the distance between (i) the first point of contact 90 of the second set of barrel threads 42b with the set of ring threads 27 proximate to the sleeve 54 and (ii) a last point of contact 94 of the second set of barrel threads 42b with the ring threads 27 farthest from the sleeve 54 and diametrically opposite to the first point of contact 90.

One skilled in the art may make a choice between the representations of equations (5) or (6) depending on the characteristics of the optical assembly and on the optical requirements to be met. For example, the accuracy of the simplified equation (5) may decrease when the radius of curvature R of the peripheral transversal surface 57 gets smaller.

Figure 9A:
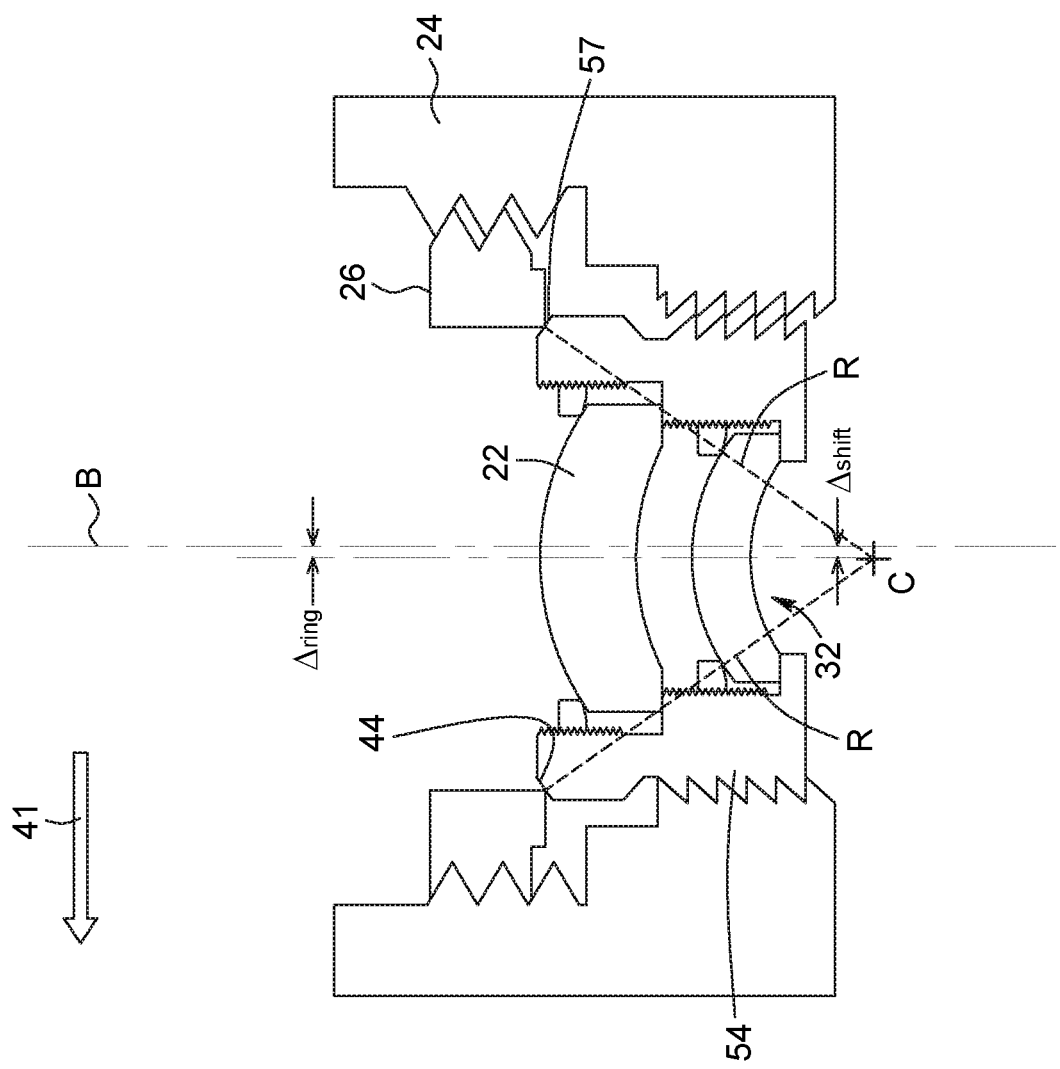
FIG. 9A is a schematic exaggerated illustration of the impact of the decentering of the retaining ring of an optical assembly on the centering of the sleeve within the barrel according to another embodiment.
Figure 9B:
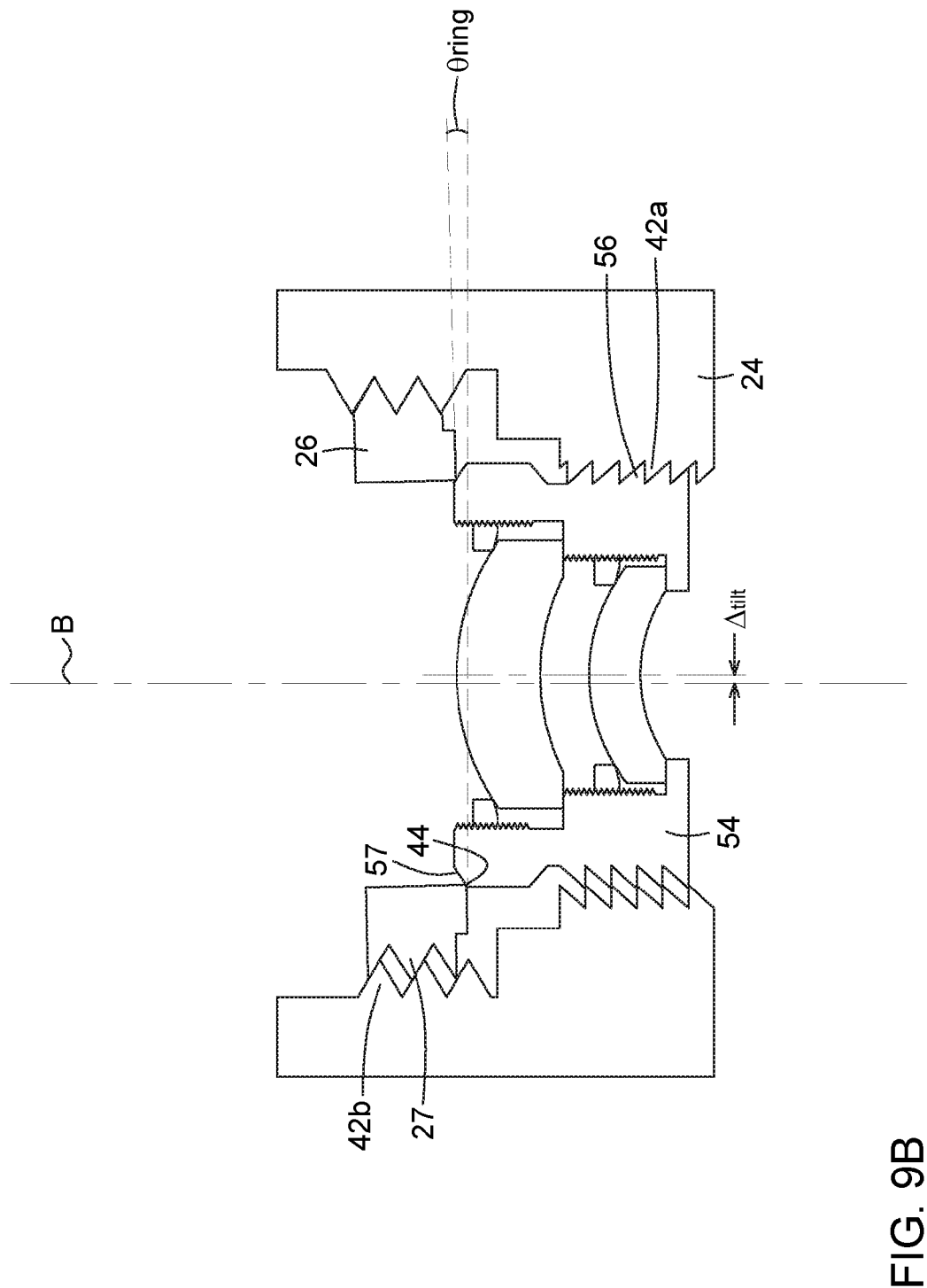
FIG. 9B is a schematic exaggerated illustration of the impact of the tilt of the retaining ring of an optical assembly on the centering of the sleeve within the barrel.
Figure 9C:
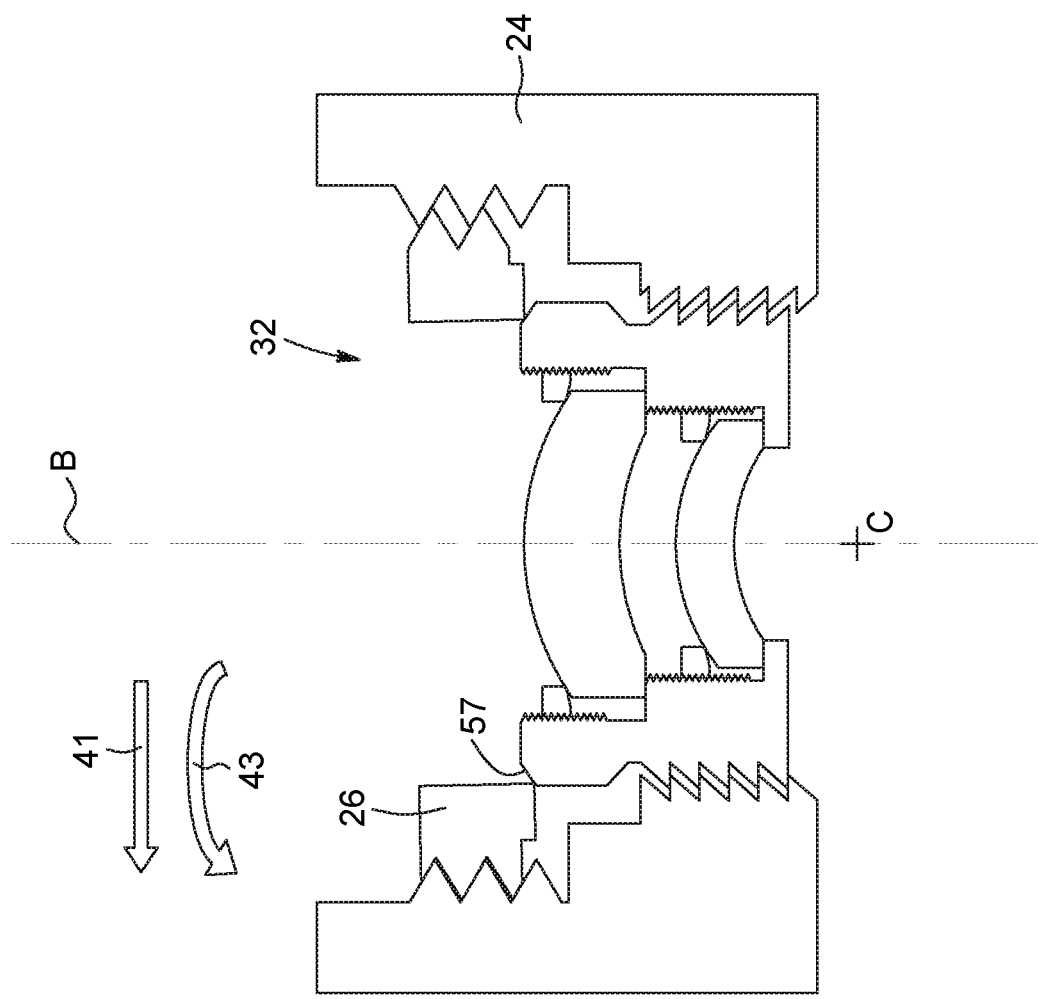
FIG. 9C is a schematic illustration of the joint impacts of the decentering and tilt of the retaining ring when the auto-centering condition explained herein is met.

The relationships explained above between the alignment of the retaining ring and the resulting orientation of the sleeve take into consideration the fact that the movement of the sleeve is constrained by the engagement of the sleeve threads with the first set of barrel threads. In the example of FIGS. 4A to 4C, the sleeve threads were considered triangular, leading to a tilting effect when the sleeve is subjected to a lateral force. Referring to FIGS. 9A to 9C, in accordance with another implementation, the sleeve may be longitudinally constrained through the use of sleeve threads and a first set of barrel threads having a face perpendicular to the center axis of the cavity. As can be seen in FIG. 9A, in this variant, a decentering of the retaining ring will result directly in a corresponding lateral shift $\Delta_{shift}$ of the sleeve, without any tilting of the sleeve. Similarly, as seen in FIG. 9B, the tilt of the retaining ring will not impart a tilt on the sleeve but will instead decenter the sleeve, which has an impact on the decentering of the center of curvature of the peripheral transversal surface 57 equivalent to $\Delta_{tilt}$. It can be shown that the auto-centering condition as expressed above will still hold, leading to a counterbalancing effect as seen in FIG. 9C.

One skilled in the art will note that equations (5) and (6) are based on models which imply that the thread profile of the second set of barrel threads is entirely defined by a symmetrical thread angle, that is, a thread profile where the opposite walls of the thread are tilted at a same angle with respect to the plane perpendicular to the center axis of the cavity.

In some embodiments, the ring threads and the second set of barrel threads may have a spatial profile that is non-symmetrical with respect to a plane perpendicular to the symmetry axis of the cavity or of the retaining ring. It can be useful to define an effective thread angle ω to take into account embodiments having non-symmetrical threads in the mathematical formalism used to establish the auto-centering condition. In the reference frame of the cavity, the effective thread angle ω may be defined as the angle formed by the rearward thread face of the ring threads and a plane P perpendicular to the center axis of the cavity. The effective thread angle ω is also given by the angle between the forward thread face of the second set of barrel threads and the plane P.

It will be readily understood that for cases where the threads are symmetrical, the effective thread angle ω corresponds simply to $\varphi_{threads}/2$, that is, half of the thread angle. Consequently, alternative manners of representing the auto-centering condition can be obtained by replacing $\varphi_{threads}/2$ by ω in equations (5) and (6) above, obtaining:

$$\frac{d_{ring}}{2\tan(\omega)} = \sqrt{R^2 - Y^2} \quad (5')$$

or $$\frac{d_{ring}}{2\tan(\omega)} = \sqrt{R^2 - Y^2} + h + T/2 \quad (6')$$

One skilled in the art will further note that the models developed above also imply that the spatial profile of the peripheral transversal surface of the sleeve is spherical, and therefore fully characterized by the specification of its radius of curvature R. In other implementations, the determining of the auto-centering condition may be based on more general models providing for a non-spherical curved spatial profile of the peripheral transversal surface. By way of example, one such model is provided in the above-mentioned U.S. Pat. No. 9,244,245 (LAMONTAGNE et al.).

Most of the parameters involved in equations (5), (5') (6) or (6') above are usually predetermined by the physical specifications of the sleeve and barrel according to design requirements. However, the effective thread angle ω of the ring threads and second set of barrel threads and the curved spatial profile of the peripheral transversal surface of the sleeve can often be controlled, separately or jointly. These parameters can therefore be selected in view of an auto-centering condition whereby any decentering of the retaining ring and a corresponding tilt of the retaining ring with respect to the center axis have counterbalancing effects on a centering of the sleeve with respect to the center axis.

In many instances, the selection of an effective thread angle for the second set of barrel threads and a spatial profile for the peripheral transversal surface of the sleeve, in view of the auto-centering condition according to embodiments of the present invention, can greatly improve the precision of the centering of the sleeve, and therefore of the optical elements mounted therein. In some embodiments, one may wish to select optimal values provided for each of these parameters through the auto-centering condition as defined. Even with such a selection, the resulting centering of the sleeve cannot, in practice, be perfect. The centering of the sleeve using the retaining ring can be affected by several tolerance factors. By way of example, using the best industry practices, the following manufacturing tolerances have to be considered in real optical assemblies:

Thread angle tolerance: ±1°;
External diameter of the retaining ring: ±0.1 mm;
Diameter of the abutment of the retaining ring: ±0.1 mm;
Radius of curvature of the peripheral transversal surface: ±1%;
Concentricity and perpendicularity tolerances of the sleeve and retaining ring abutments: ≤0.010 mm (±0.005 mm).

Of course, the overall centering of an optical element such as a lens with respect to the barrel will be impacted by both the centering of the lens with respect to the sleeve, and the centering of the sleeve with respect to the barrel.

It has been demonstrated by the inventors that selecting parameters obtained from the auto-centering condition can provide a centering of the sleeve with respect to the center axis to a precision of typically 12 μm or better, including the manufacturing tolerances mentioned above. In other embodiments, where such a high precision is not necessary, one skilled in the art may wish to select values for the parameters of the design which approach, but without matching precisely, those provided by the auto-centering condition. As the decentering and tilt of the retaining ring can have an impact on the centering of the sleeve which can be more than 150 μm if not addressed, a significant improvement can be obtained through the selection of parameters approaching those given by the auto-centering condition. Such values are preferably selected to match values meeting the auto-centering condition within a predetermined centering requirement, imposed by a particular application. In one example, if an effective thread angle is adjusted in view of the centering condition, its selected value could be adjusted to the closest multiple of 5° while still providing sufficient precision on the centering of the optical element for many applications. One skilled in the art will readily understand how to apply these principles in view of particular design requirements.

One skilled in the art can therefore find a pair of values for the effective thread angle ω of the ring threads and the curved spatial profile of the peripheral transversal surface of the sleeve for a particular application which meets the auto-centering condition while also taking into consideration other design requirements or limitations. In other scenarios, the other parameters involved in the auto-centering condition, such as the half-diameter Y of the abutment of the retaining ring and the external diameter $d_{ring}$ of the retaining ring could additionally be subjected to slight adjustment in order to fine tune the centering of the sleeve.

In some implementations, such as for example in the design of FIG. 2A, the second set of barrel threads 42b and the ring threads 27 may have a thread profile which corresponds to typical threading used in optical assemblies. As one skilled in the art will readily understand, the thread profile is not commonly used as a design feature. Typically, the shape and angle of the threads machined on components of an optical assembly will depend on available threading tools and/or usual thread standards. In some embodiments, the thread profile of the second set of barrel threads and ring threads can therefore correspond to a standard thread established by a standard setting authority, and the radius of curvature of the peripheral transversal surface is the parameter adjusted to meet the auto-centering condition. Examples of thread standard setting authorities include the International Organization for Standardization (ISO), the American Society of Mechanical Engineers (ASME), the American National Standards Institute (ANSI) or the German Institute for Standardization (Deutsches Institut für Normung or DIN). In typical embodiments, the thread profile is symmetrical, defining a triangular or trapezoidal shape, and the thread angle has a value of 29°, 55° or 60°, the most commonly used thread standards for optical assemblies. In such embodiments, the sleeve may be manufactured or shaped post-manufacturing so that its peripheral transversal surface has a radius of curvature meeting the auto-centering condition.

In alternative embodiments, the thread angle of the second set of barrel threads and of the ring threads may have a value other than 29°, 55° or 60° but adjusted to meet the auto-centering condition. This is for example illustrated in the embodiment of FIG. 5. Such an embodiment may for example be useful in implementations where shaping the peripheral transversal surface of the sleeve may be difficult or impractical. In yet other implementations, both the effective angle of the second set of barrel threads and ring threads and the spatial profile of the peripheral transversal surface may be adjusted for meeting the auto-centering condition.

In practice, in optical assemblies according to various implementations, when the retaining ring is screwed within the barrel and abuts on the sleeve, the resulting mechanical forces in the system typically act to push the retaining ring away from the sleeve. Referring back to FIG. 2A, in the illustrated frame of reference it can be seen that the barrel 24 and the retaining ring 26 are engaged in such a manner that the rearward thread face 104 of each ring thread 27 pushes against the corresponding forward thread face 102 of the second set of barrel threads 42b. The practical impact of the rearward thread face 108 of each barrel thread of the second set 42b and of the forward thread face 106 of each ring thread 27 in the balance of forces within the assembly is null or negligible; these faces do not contact each other or any other surface. As a consequence, it will be readily understood that the auto-centering condition described herein, as well as the complementarity of the ring threads 27 and second set of barrel threads 42b, need only to apply to the surfaces contacting each other, that is, the rearward thread face 104 of the ring threads 27 and the forward thread face 102 of the second set of barrel threads 42b.

Figure 8:
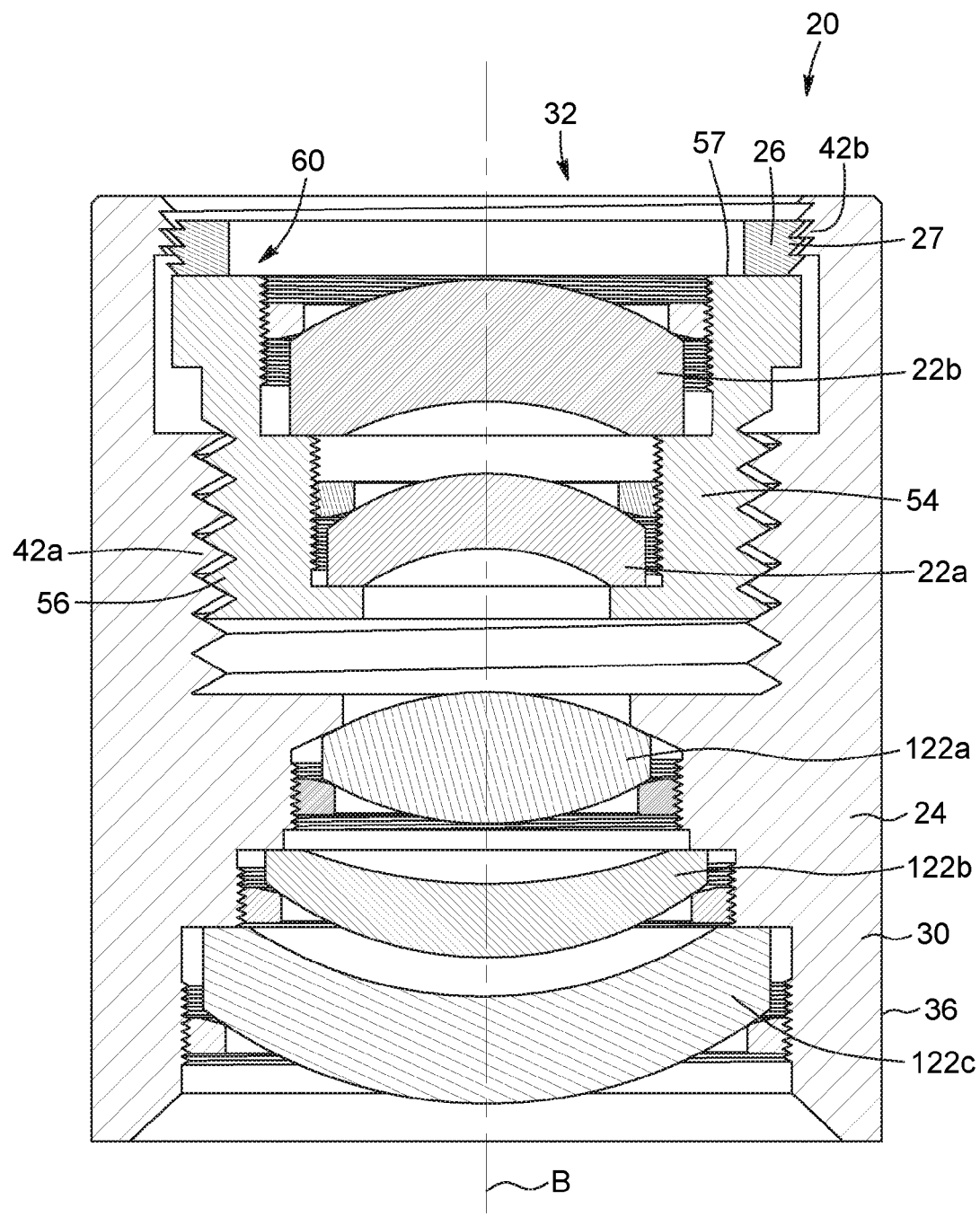
FIG. 8 is a schematic illustration of an optical assembly including ring threads having a rearward thread face extending parallel to a plane P perpendicular to the center axis of the cavity according to another embodiment.
Figure 8A:
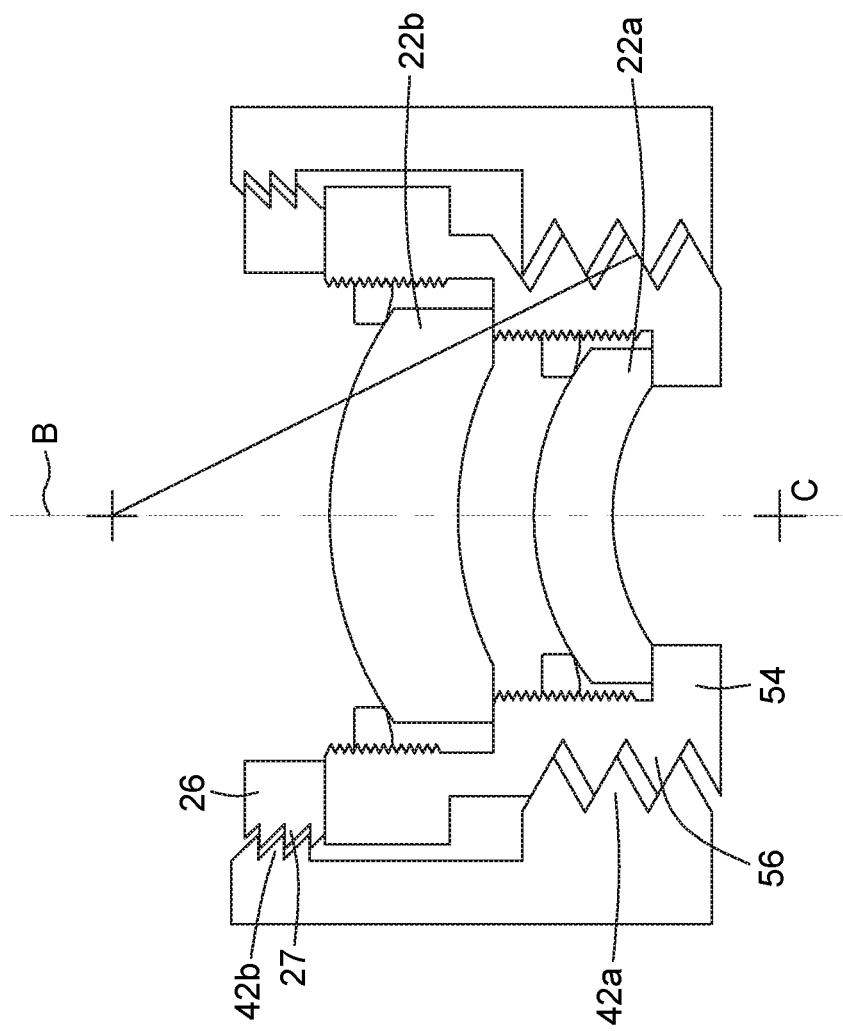
FIG. 8A is an enlarged view of a portion of the optical assembly of FIG. 8.

In the embodiments described above, the centering of the sleeve within the cavity of the barrel is achieved through the defined auto-centering condition. Referring to FIGS. 8 and 8A, in another implementation the orientation of the rearward thread face of the ring threads may be parallel to the plane P perpendicular to the center axis of the cavity, and the spatial profile of the peripheral transversal surface 57 of the rearward end of the sleeve may also extend parallel to the plane P. Such a configuration can also provide a centering of the sleeve within the cavity throughout the longitudinal displacement of the sleeve within the cavity.

Barrel Threads Variants

Figure 6:
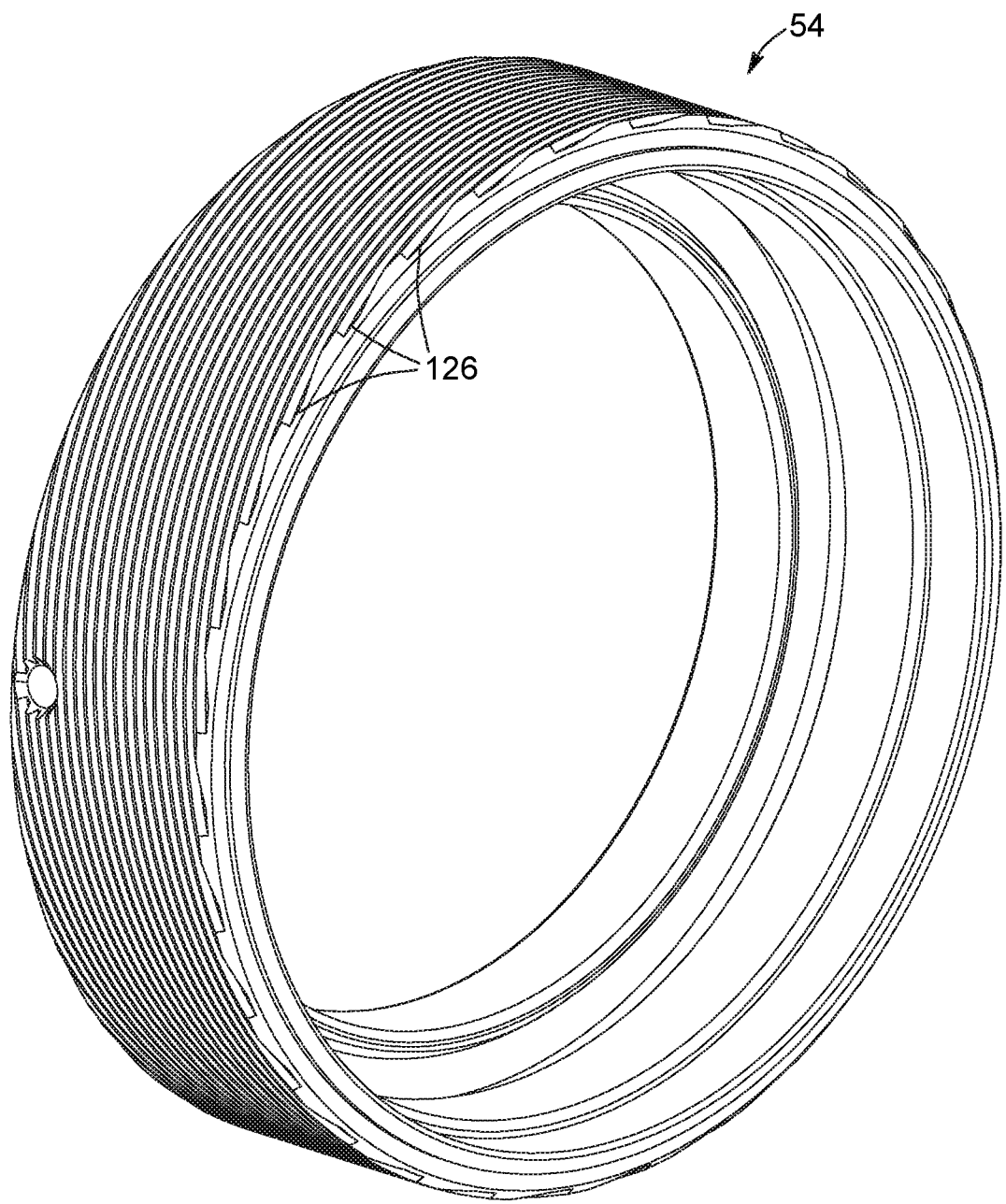
FIG. 6 is a schematic illustration of a retaining ring having ring threads with multiple starts according to one embodiment.

In accordance with another variant, either or both of the first and second set of barrel threads, as well as the corresponding ring threads and sleeve threads may have a thread profile including multiple starts. By way of example, FIG. 6 shows a sleeve 54 having a thread profile including multiple starts 126. Such an embodiment may be of particular interest in applications where the longitudinal displacement of the sleeve provides a focus or zooming mechanism. The provision of multiple starts can be practical to increase the displacement range of the sleeve while still benefiting from compact threads. This feature can additionally provide an improvement in the user experience adjusting the focus or zoom. By way of example, a focus or zooming mechanism necessitating an 8-mm stroke of longitudinal adjustment with a travel of 1 mm per turn of the sleeve will require 8 full turns to reach the end of the course. By contrast, the entire 8-mm stroke can be covered in one turn when using a thread profile having 8 starts, for a same thread pitch and a same thread angle. As one skilled in the art will readily understand, the number of starts can vary from one implementation to the other.

In accordance with another aspect, from the description above it will be understood that the provision of a longitudinal displacement of the sleeve mainly involves the rearward thread face of the first set of barrel threads, whereas the centering of the sleeve imposes a condition on the forward thread face of the second set of barrel threads. As explained above, the forward thread face of the first set of barrel threads and the rearward thread face of the second set of barrel threads have no significant impact on the position of the sleeve within the barrel. In accordance with some embodiments, the first and second sets of barrel threads may have a same thread profile. This same thread profile is therefore defined by a rearward thread face and a forward thread face forming together an effective thread angle with respect to a plane P perpendicular to the center axis of the cavity meeting the auto-centering condition in conjunction with the peripheral transversal surface of the sleeve.

Figure 7:
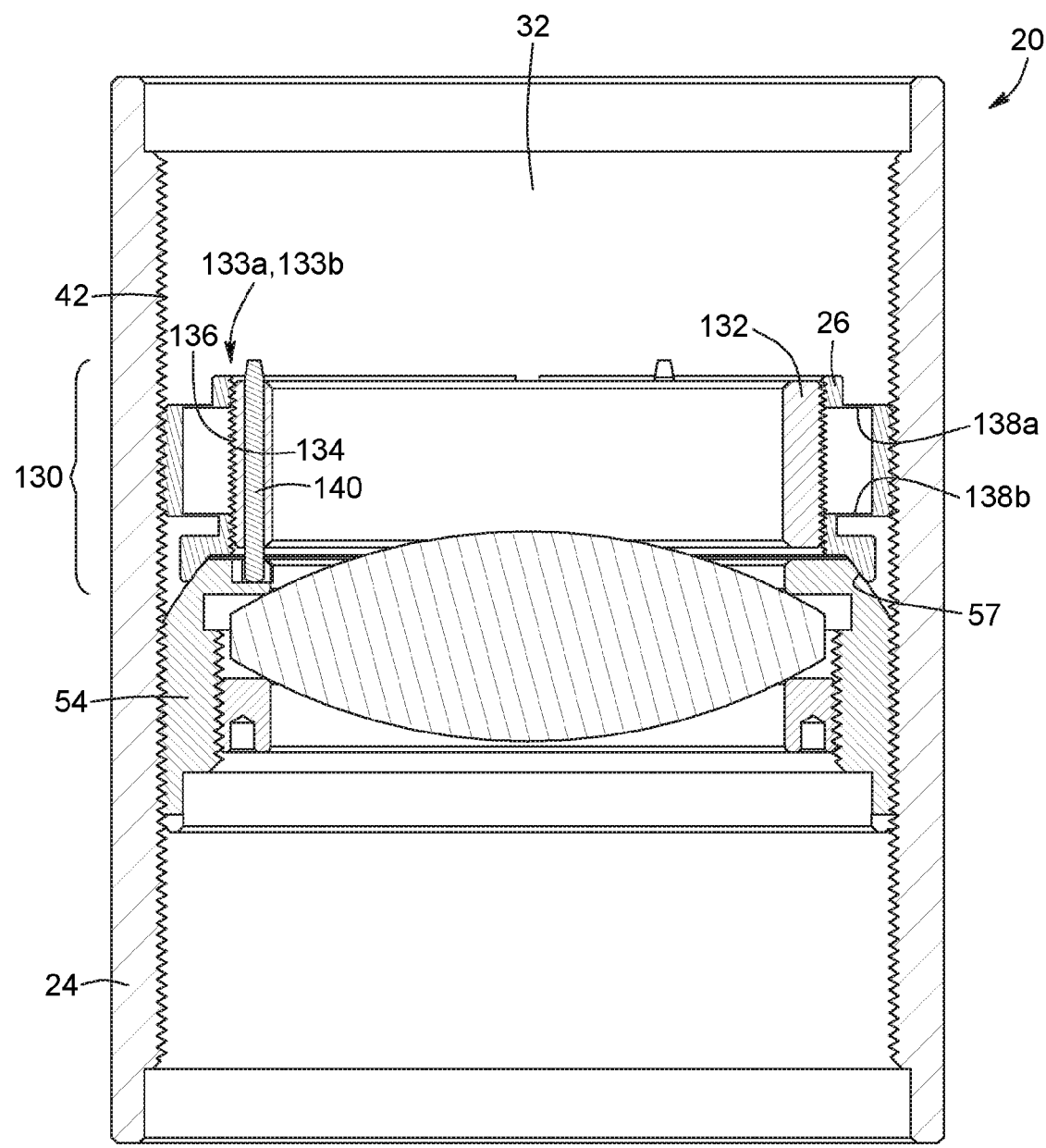
FIG. 7 is a schematic illustration of an optical assembly including a continuous barrel thread path and a pre-loading mechanism according to one embodiment.

Referring to FIG. 7, there is shown an embodiment of an optical assembly 20 where the first and second sets of barrel threads 42a, 42b have such a same thread profile, including a rearward thread face 112 and a forward thread face 102 forming an effective thread angle ω with respect to a plane P perpendicular to the center axis of the cavity, that is selected in view of the auto-centering condition. It will be readily understood that either one or both of the effective thread angle and the spatial profile of the peripheral transversal region may be adapted, selected or designed in view of other physical parameters of the assembly in order for the auto-centering condition to be met. As will be readily understood by one skilled in the art, in such an embodiment the effective thread angle is actually half of the angle between the forward and rearward faces of the barrel threads of both sets 42a, 42b. Advantageously, such an embodiment may simplify the manufacturing of the assembly by requiring a single threading tool to machine both sets of barrel threads 42a, 42b.

Optionally, in the illustrated embodiment, the first and second sets of barrel threads 42a, 42b form a continuous thread path 42 along the inner wall 34 of the barrel 24. In other variants, the first and second sets of barrel threads may be longitudinally separated by a threadless portion of the inner wall within departing from the scope of the invention.

Self-Centering Criterion

It will be readily understood by one versed in the art, from a reading of the present specification as a whole, that the optical assembly should allow for some movement between the first set of barrel threads and the sleeve threads, and between the peripheral transversal surface of the sleeve and the abutment of the retaining ring. In some embodiments, this implies that the sleeve meets the so-called "self-centering" criterion known in the art. Self-centering refers to the capacity of the sleeve to roll or slide at its forward end, as allowed by the engagement of the first set of barrel threads and sleeve threads. A parallel can be drawn with the so-called "self-centering" of an optical element, which is considered to be met when an optical element has a coefficient of friction with respect to its seat and retaining ring sufficiently small to allow a rolling or other movement of the optical element. For more information on this concept, reference can for example be made to Paul Yoder Jr., "Mounting Optics in Optical Instruments", SPIE Press (2008).

It will be readily understood that the expression "self-centering" explained above and regularly used in the art refers to a different concept than the "auto-centering" of the present application.

Pre-Loading Mechanism

Using optical assemblies such as those of the embodiments described above, effecting a change in position of the sleeve, for example in the context of a focussing or zooming operation, typically involves two separate adjustments; on one hand, the sleeve is to be longitudinally displaced to the new desired position along the center axis of the barrel, and on the other hand the position of the retaining ring has to be corrected in view of the new position of the sleeve, to ensure a proper engagement.

Figure 7A:
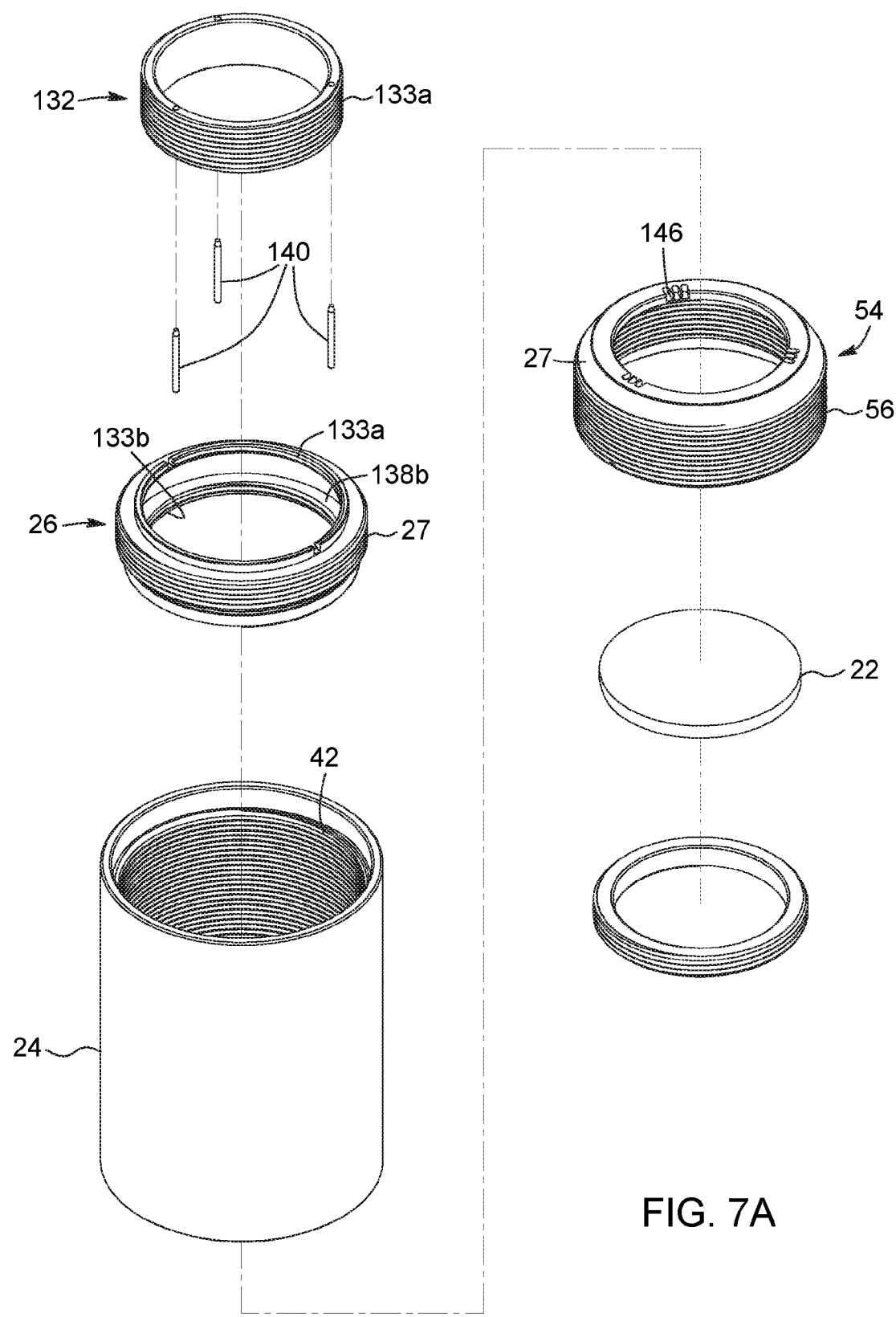
FIG. 7A is an exploded view of the optical assembly of FIG. 7.
Figure 7B:
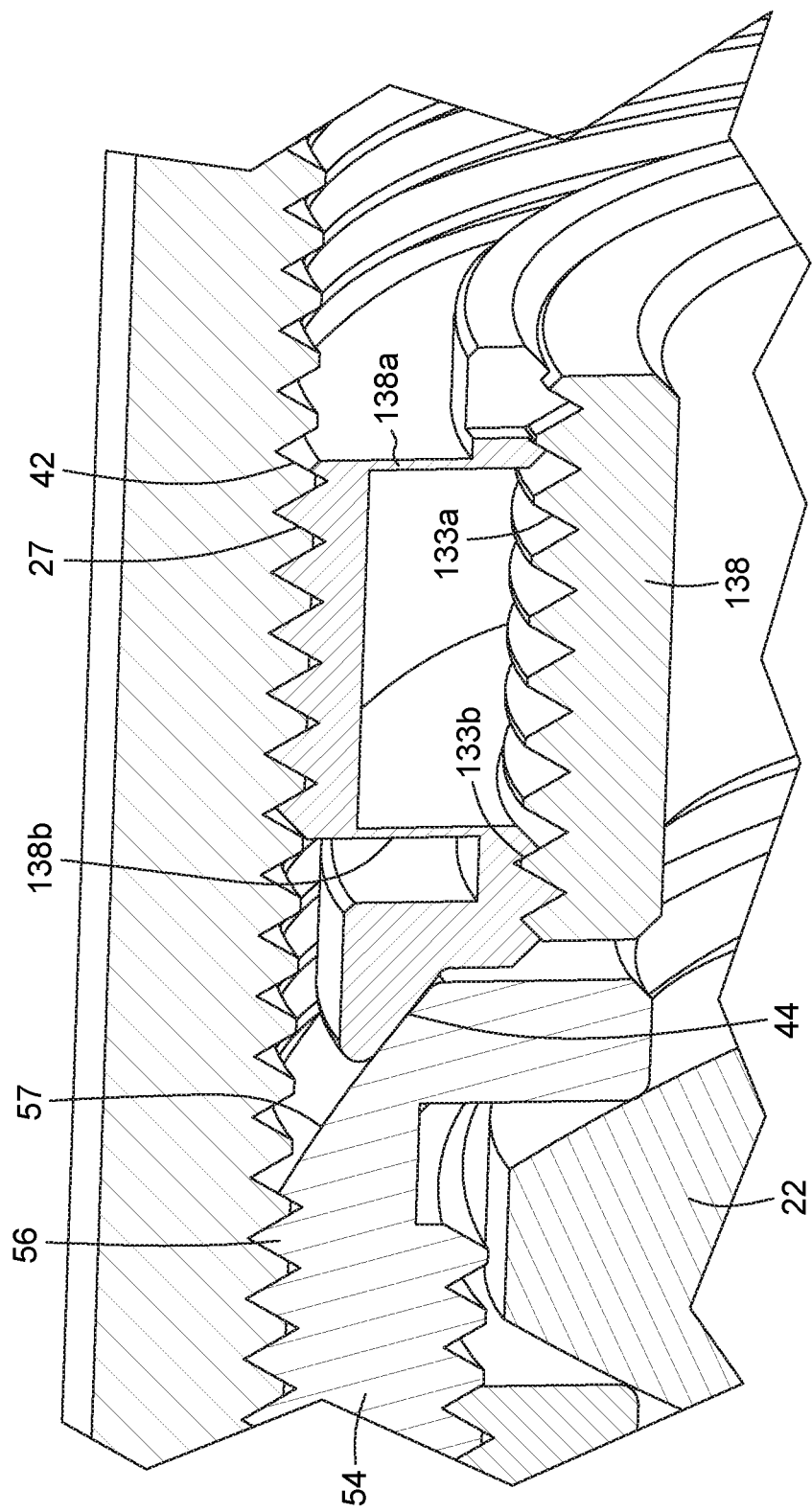
FIG. 7B is an enlarged cross-sectional elevation view of a portion of the optical assembly of FIG. 7.

With continued reference to FIG. 7 and additional reference to FIGS. 7A and 7B, in some embodiments the optical assembly 20 may further include a pre-loading mechanism 130, sometimes referred to as an "anti-backlash" mechanism, biasing the retaining ring 26 against the peripheral transversal surface 57 of the sleeve 54, which can advantageously simplify the operation described in the previous paragraph.

As will be understood by one skilled in the art, applying a preload on the engagement of the abutment 44 of the retaining ring 26 with the peripheral transversal surface 57 of the sleeve 54 provides an longitudinal course for the sleeve 54 within the cavity 32 along which the contact and pressure between the abutment 44 and the peripheral transversal surface 57 is maintained. The sleeve 54 can therefore be displaced along this course without the need to reposition the retaining ring 26. It will be readily understood that such a pre-loading mechanism 130 has a spring force extending mainly axially within the cavity 32, that is, parallel to the center axis. In this manner, even if the retaining ring 26 is not perfectly centered within the cavity 32 (for example when the auto-centering condition compensates for its misalignment), the relative orientation of the retaining ring 26 and the sleeve 54 remains the same no matter the longitudinal position of the sleeve 54 within the cavity 32, preserving the axial pre-load required for the continued centering of the sleeve 54.

In the illustrated embodiment of FIGS. 7, 7A and 7B, the pre-loading mechanism 130 includes a locking ring 132 threaded within the retaining ring 26. Complementary threads 133a, 133b are provided on an outer surface 134 of the locking ring 132 and on an inner surface 136 of the retaining ring 26 to allow the engagement of these two components. The pre-loading mechanism 130 further includes flexural elements structurally linking the ring threads 27 and the abutment 44 of the retaining ring 26. In the illustrated variant, the flexural elements are parallel leaf springs 138a, 138b operatively connected to the threaded perimeter wall of the retaining ring 26. Finally, the pre-loading mechanism 130 also includes a locking mechanism rotationally locking the sleeve 54 and the locking ring 132, such as one or more pins 140 inserted through the locking ring 132 and engaging the sleeve 54. As will be readily understood by one skilled in the art, although three equidistant pins 140 are shown in the illustrated variant, a different number and/or a different distribution of such pins could alternatively be considered.

In this embodiment, in order to longitudinally displace the sleeve 54, a user can simply impose a rotation on the sleeve 54. This rotation is directly imparted onto the locking ring 132 through the locking pins 140. However, the engagement of the retaining ring 26 with the barrel threads 42 is not affected, as the locking ring 132 moves relative to the retaining ring 26 through their complementary threads 133a, 133b. The abutment 44 remains in contact with the peripheral transversal surface 57 of the sleeve 54 through the parallel flexing of the leaf springs 138a, 138b.

It will be noted that although the pre-loading mechanisms of FIGS. 7 and 7B are shown applied to optical assemblies where the first and second sets of barrel threads form a continuous threading path, such a mechanism may be used in variants of optical assemblies where the first and second sets of barrel threads form distinct paths and/or thread profiles without departing from the scope of the invention. Furthermore, pre-loading mechanisms may be used with various thread profiles for the first and second sets of barrel threads, sleeve threads and ring threads such as described above.

Outer Sleeve

Figure 10:
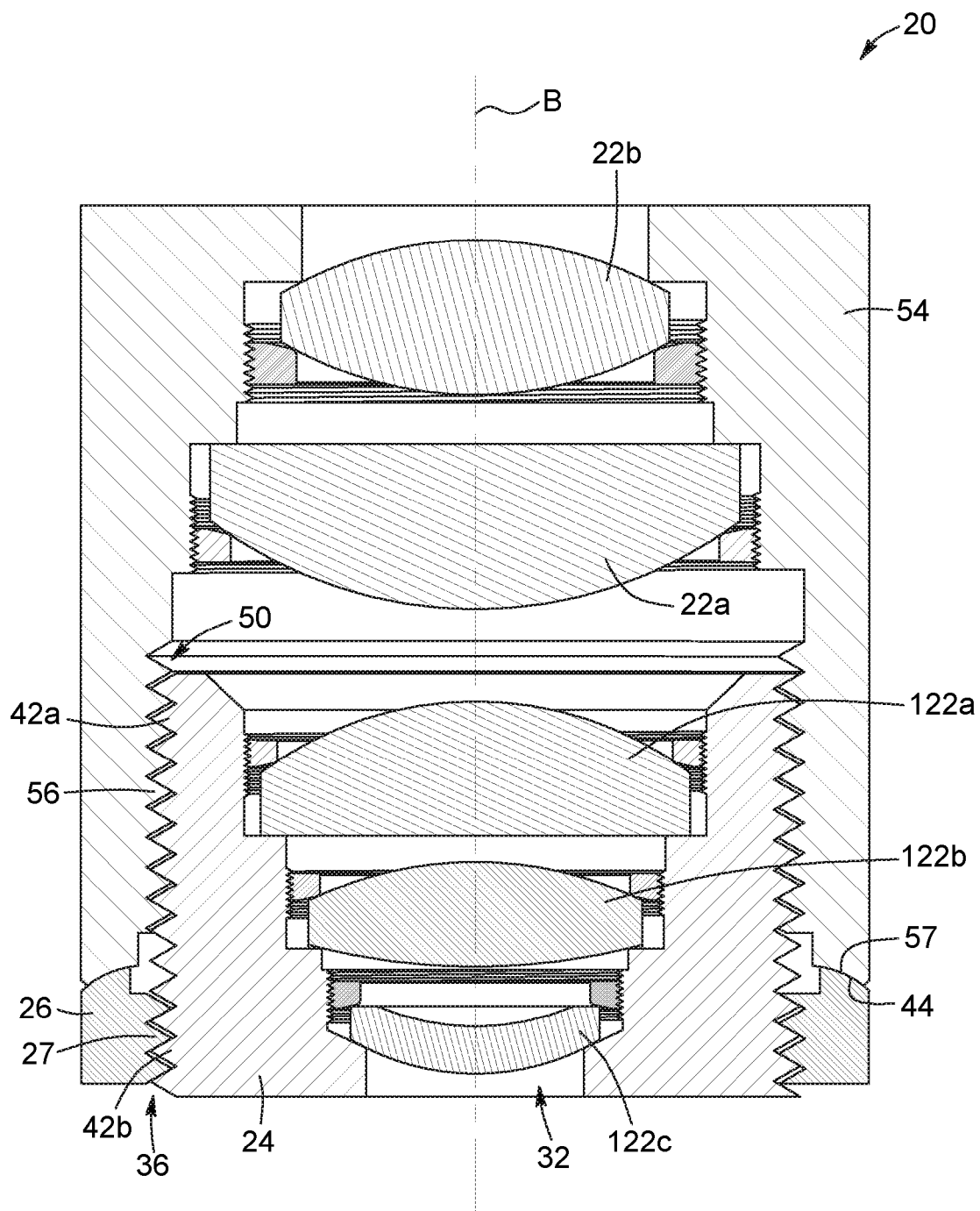
FIG. 10 is a schematic cross-section view of an optical assembly including a sleeve threaded over a barrel.

Referring to FIG. 10, in accordance with another embodiment there is shown an optical assembly 20 in which the sleeve 54 is threadable over the barrel 24 instead of being inserted in the cavity 32. In this embodiment, the first set of barrel threads 42a and the second set of barrel threads 42b are provided on the outer wall 36 of the barrel 24. The sleeve threads 56 are provided on an inner wall 50 of the sleeve 54. As with previous embodiments, the sleeve threads 56 engage the first set of barrel threads 42a so as to allow a longitudinal displacement of the sleeve with respect to the barrel 24 upon a rotation of the sleeve 54 (or of the barrel 24). At least one optical element 22 is mounted and centered within the sleeve 54, and additional optical elements 122 may be mounted directly in the cavity 32 of the barrel 24.

In this embodiment, the retaining ring 26 extends outside of the barrel 24 and is affixed to the barrel 24 through the ring threads 27 which are provided inside of the retaining ring 26. The ring threads 27 engage the second set of barrel threads 42b. As with previous embodiments, the abutment 44 of the retaining ring 26 engages the peripheral transversal surface 57 of the sleeve 54. The orientation of the rearward thread face of the ring threads and the spatial profile of the peripheral transversal surface are selected to provide a centering of the sleeve 54 with respect to the center axis B of the barrel 24 throughout the longitudinal displacement of the sleeve 54 with respect to the barrel 24.

It will be readily understood that in the illustrated configuration, assuming that the ring threads and the peripheral transversal surface are to meet the auto-centering condition, then preferably the abutment 44 of the retaining ring 26 has a convex shape facing the peripheral transversal surface 57 of the sleeve 54. The convex shape implies that the contributions of the decentering and tilt of the retaining ring 26 with respect to the center axis B act to decenter the sleeve 54 along opposite directions, as otherwise and therefore the counterbalancing effect leading to the auto-centering condition would not be enabled.

Although FIG. 10 shows first and second sets of barrel threads 42a and 42b having a triangular thread shape and forming a continuous thread path along the outer wall 36 of the barrel 24, it will be readily understood that in other variants the first and second sets of barrel threads may have thread profiles differing from one another. Furthermore, the centering of the sleeve with respect to the barrel may be provided through the use of ring threads having a rearward thread face extending perpendicularly to the center axis of the cavity, with the peripheral transversal surface 57 of the sleeve 54 extending according to the same orientation, as shown for example in the embodiment of FIG. 8.

Of course, numerous modifications could be made to the embodiments described above without departing from the scope of the invention as defined in the appended claims.

The invention claimed is:

1. An optical assembly, comprising:
a barrel defining a cavity having a center axis, the barrel comprising an inner wall provided with a first set of barrel threads and a second set of barrel threads;
a sleeve inserted in the cavity and having a forward end and a rearward end, the forward end comprising an outer wall provided with a set of sleeve threads engaging the first set of barrel threads so as to allow a longitudinal displacement of the sleeve within the cavity upon rotation of the sleeve, the rearward end of the sleeve comprising a peripheral transversal surface having a curved spatial profile;
at least one optical element mounted within the sleeve and centered with respect to the sleeve; and
a retaining ring affixed to the barrel through a set of ring threads engaging the second set of barrel threads, the retaining ring having an abutment engaging the peripheral transversal surface of the sleeve, the ring threads having a rearward thread face forming an effective thread angle with respect to a plane perpendicular to the center axis of the cavity,
wherein the effective thread angle of the ring threads and the curved spatial profile of the peripheral transversal surface are selected in view of an auto-centering condition whereby any decentering of the retaining ring and corresponding tilt of the retaining ring with respect to the center axis have counterbalancing effects on centering of the sleeve with respect to the center axis.

2. The optical assembly according to claim 1, wherein the curved spatial profile of the peripheral transversal surface of the sleeve is characterized by a radius of curvature, and the auto-centering condition relates the effective thread angle and the radius of curvature according to:

$$\frac{d_{ring}}{2\tan(\omega)} = \sqrt{R^2 - Y^2} + h + T/2$$

where:
$d_{ring}$ is a diameter of the retaining ring along the ring threads;
$\omega$ is the effective thread angle of the second set of barrel threads and of the ring threads;
R is the radius of curvature of the peripheral transversal surface;
Y is a half-diameter of the abutment of the retaining ring;
h is the distance between (i) a first point of contact of the second set of barrel threads with the ring threads proximate to the sleeve and (ii) a point of contact of the abutment of the retaining ring with the peripheral transversal surface of the sleeve; and
T is the distance between (i) the first point of contact of the second set of barrel threads with the ring threads proximate to the sleeve and (ii) a last point of contact of the second set of barrel threads with the ring threads farthest from the sleeve and diametrically opposite to the first point of contact.

3. The optical assembly according to claim 1, wherein the second set of barrel threads and the ring threads have a symmetrical thread profile characterized by a thread angle corresponding to twice the effective thread angle.

4. The optical assembly according to claim 3, wherein the thread angle of the second set of barrel threads and of the ring threads has a value of 29°, 55° or 60°, and the peripheral transversal surface is adjusted to meet the auto-centering condition.

5. The optical assembly according to claim 3, wherein the thread angle of the second set of barrel threads and of the ring threads has a value other than 29°, 55° or 60°, and adjusted to meet the auto-centering condition.

6. The optical assembly according to claim 1, wherein the first and second sets of barrel threads have a same thread profile.

7. The optical assembly according to claim 6, wherein the first and second sets of barrel threads form a continuous thread path along the inner wall of the cavity.

8. An optical assembly, comprising:
a barrel defining a cavity having a center axis, the barrel comprising an inner wall provided with a first set of barrel threads and a second set of barrel threads;
a sleeve inserted in the cavity and having a forward end and a rearward end, the forward end comprising an outer wall provided with a set of sleeve threads engaging the first set of barrel threads so as to allow a longitudinal displacement of the sleeve within the cavity upon rotation of the sleeve, the rearward end of the sleeve comprising a peripheral transversal surface having a spatial profile;
at least one optical element mounted within the sleeve and centered with respect to the sleeve; and
a retaining ring affixed to the barrel through a set of ring threads engaging the second set of barrel threads, the retaining ring having an abutment engaging the peripheral transversal surface of the sleeve, the ring threads having a rearward thread face,
wherein the rearward thread face of the ring threads and the spatial profile of the peripheral transversal surface extend perpendicularly to the center axis of the cavity.

9. An optical assembly, comprising:
a barrel defining a cavity having a center axis, the barrel comprising an inner wall provided with a first set of barrel threads and a second set of barrel threads;
a sleeve inserted in the cavity and having a forward end and a rearward end, the forward end comprising an outer wall provided with a set of sleeve threads engaging the first set of barrel threads so as to allow a longitudinal displacement of the sleeve within the cavity upon rotation of the sleeve, the rearward end of the sleeve comprising a peripheral transversal surface having a spatial profile;
at least one optical element mounted within the sleeve and centered with respect to the sleeve; and
a retaining ring affixed to the barrel through a set of ring threads engaging the second set of barrel threads, the retaining ring having an abutment engaging the peripheral transversal surface of the sleeve, the ring threads having a rearward thread face, an orientation of the rearward thread face of the ring threads and the spatial profile of the peripheral transversal surface being selected to provide a centering of the sleeve with respect to the center axis of the cavity throughout the longitudinal displacement of the sleeve within the cavity.

10. The optical assembly according to claim 9, wherein the at least one optical element comprises a lens, a mirror, a diffractive optical element, a MOEMS, a DLP system, a detector, a camera, a prism, an optical fiber, a LCD, a laser source, a LED or a pinhole.

11. The optical assembly according to claim 9, further comprising at least one fixed optical element mounted within the cavity, the longitudinal displacement of the sleeve within the cavity thereby changing a distance between the at least one fixed optical element and the at least one optical element mounted within the sleeve.

12. The optical assembly according to claim 9, wherein the barrel is affixed to an external optical structure comprising at least one fixed optical element optically aligned with the cavity of the barrel, the longitudinal displacement of the sleeve within the cavity thereby changing a distance between the at least one fixed optical element and the at least one optical element mounted within the sleeve.

13. The optical assembly according to claim 9, wherein:
the spatial profile of the peripheral transversal surface is curved;
the rearward thread face of the ring threads forms an effective thread angle with respect to a plane perpendicular to the center axis of the cavity,
the effective thread angle and the curved spatial profile of the peripheral transversal surface are selected in view of an auto-centering condition whereby any decentering of the retaining ring and corresponding tilt of the retaining ring with respect to the center axis have counterbalancing effects on centering of the sleeve with respect to the center axis.

14. The optical assembly according to claim 9, wherein the thread profile of the second set of barrel threads and of the ring threads defines a triangular shape or a trapezoidal shape.

15. The optical assembly according to claim 9, wherein the rearward face of the ring threads and the peripheral transversal surface extend perpendicularly to the center axis of the cavity.

16. The optical assembly according to claim 9, wherein the first set of barrel threads and the sleeve threads have a symmetrical thread profile.

17. The optical assembly according to claim 9, wherein the first set of barrel threads have a forward thread face that extends perpendicularly to the center axis of the cavity and the sleeve threads have a rearward thread face that extends perpendicularly to the center axis of the cavity.

18. The optical assembly according to claim 9, wherein at least one of the first set of barrel threads and the second set of barrel threads has a thread profile comprising multiple starts.

19. The optical assembly according to claim 9, further comprising a pre-loading mechanism biasing the retaining ring against the peripheral transversal surface of the sleeve.

20. The optical assembly according to claim 19, wherein the pre-loading mechanism comprises:
flexural elements structurally linking the ring threads and the abutment of the retaining ring; and
a locking mechanism rotationally locking the sleeve.

21. The optical assembly according to claim 20, wherein the locking mechanism comprises a locking ring threaded within the retaining ring, and at least one pin inserted through the locking ring and engaging the sleeve.

* * * * *